(12) United States Patent
Richardson et al.

(10) Patent No.: US 12,102,067 B1
(45) Date of Patent: Oct. 1, 2024

(54) ARTIFICAL REEF STRUCTURE

(71) Applicant: Reef Arches PHC, LLC, West Palm Beach, FL (US)

(72) Inventors: Keith Richardson, Lake Worth, FL (US); Nicholas Andre Bourdon, West Palm Beach, FL (US)

( * ) Notice: Subject to any disclaimer, the term of this patent is extended or adjusted under 35 U.S.C. 154(b) by 0 days.

(21) Appl. No.: 18/395,902

(22) Filed: Dec. 26, 2023

Related U.S. Application Data

(60) Provisional application No. 63/465,937, filed on May 12, 2023.

(51) Int. Cl.
*A01K 61/73* (2017.01)

(52) U.S. Cl.
CPC .................... *A01K 61/73* (2017.01)

(58) Field of Classification Search
CPC ........................................ A01K 61/73
See application file for complete search history.

(56) References Cited

U.S. PATENT DOCUMENTS

| | | | | |
|---|---|---|---|---|
| 834,950 | A * | 11/1906 | Van Wile | E04F 15/04 446/124 |
| 2,069,715 | A * | 8/1937 | Arpin | E02B 3/06 405/25 |
| 3,653,216 | A * | 4/1972 | Stickler, Jr. | E02B 3/04 405/33 |
| 3,953,976 | A * | 5/1976 | Morren | E02B 3/06 405/21 |
| 4,083,190 | A * | 4/1978 | Pey | E02B 3/129 D25/115 |
| 4,481,155 | A * | 11/1984 | Frohwerk | F28F 25/085 428/116 |
| 5,405,217 | A * | 4/1995 | Dias | E02B 3/126 405/15 |
| 5,803,660 | A * | 9/1998 | Warren | F01B 1/12 119/221 |
| 6,186,702 | B1 * | 2/2001 | Bartkowski | A01K 61/70 119/221 |

(Continued)

FOREIGN PATENT DOCUMENTS

| | | |
|---|---|---|
| CN | 103858799 A | 6/2014 |
| CN | 206150186 U | 5/2017 |

(Continued)

*Primary Examiner* — Monica L Perry
*Assistant Examiner* — Brittany A Lowery
(74) *Attorney, Agent, or Firm* — Derek Fahey; The Plus IP Firm, PLLC

(57) ABSTRACT

A system for stabilizing soil for accretion and retention of coastal water soil is disclosed. The system includes a plurality of artificial reef segments, where each segments comprises a homogenous curved frame structure, a plurality of openings extending through the homogenous curved frame structure, a plurality of frame segments, and a plurality of cutouts disposed along a terminating end of each artificial reef segment. In one embodiment, an artificial reef configuration is disclosed having a first reef segment arranged on top of a second reef segment and a third reef segment in such a way that the cutouts of the first reef segment receive at least one of the plurality of frame segments of the second reef segment and the third reef segment. Furthermore, a transport configuration includes a first reef segment stacked on top of a second reef segment.

20 Claims, 31 Drawing Sheets

(56) References Cited

U.S. PATENT DOCUMENTS

| | | | | |
|---|---|---|---|---|
| 6,213,682 | B1* | 4/2001 | Karnas | E02B 3/046 |
| | | | | 405/35 |
| 8,567,149 | B2* | 10/2013 | Kuzmin | A63H 33/08 |
| | | | | 52/592.1 |
| 9,410,314 | B1* | 8/2016 | Kadosh | E02B 3/108 |
| 11,718,969 | B1* | 8/2023 | Johnson | E02B 3/06 |
| | | | | 405/211 |
| 2002/0119006 | A1 | 8/2002 | Moore | |
| 2011/0250017 | A1* | 10/2011 | Sung | A01K 61/70 |
| | | | | 405/25 |
| 2015/0264898 | A1* | 9/2015 | Ortego | A01K 61/70 |
| | | | | 119/234 |
| 2020/0100474 | A1 | 4/2020 | Ewald | |
| 2021/0251197 | A1* | 8/2021 | Gagliano | A01K 61/54 |
| 2023/0013261 | A1 | 1/2023 | Bateman et al. | |
| 2023/0039419 | A1* | 2/2023 | Pons | E02B 3/046 |

FOREIGN PATENT DOCUMENTS

| | | | |
|---|---|---|---|
| CN | 207040566 U | 2/2018 | |
| CN | 109496945 A | 3/2019 | |
| CN | 110495416 A | 11/2019 | |
| CN | 112939232 A | 6/2021 | |
| CN | 114215001 A | 3/2022 | |
| CN | 216796166 U | 6/2022 | |
| CN | 217308782 U | 8/2022 | |
| CN | 217428994 | 9/2022 | |
| GB | 2610697 A * | 3/2023 | ............ A01K 61/73 |
| JP | S5325586 U | 3/1978 | |
| JP | S53150795 U | 11/1978 | |
| JP | H03112249 U | 5/1991 | |
| JP | 2007006768 A | 1/2007 | |
| KR | 200197703 Y1 | 9/2000 | |
| KR | 20030003179 A | 1/2003 | |
| KR | 100562676 B1 | 3/2006 | |
| KR | 100945373 B1 | 3/2010 | |
| KR | 101001828 B1 | 12/2010 | |
| KR | 101033968 B1 | 5/2011 | |
| KR | 101525963 B1 | 6/2015 | |
| KR | 20190021721 A | 3/2019 | |
| KR | 102229486 B1 | 3/2021 | |
| WO | 2021070081 A1 | 4/2021 | |

* cited by examiner

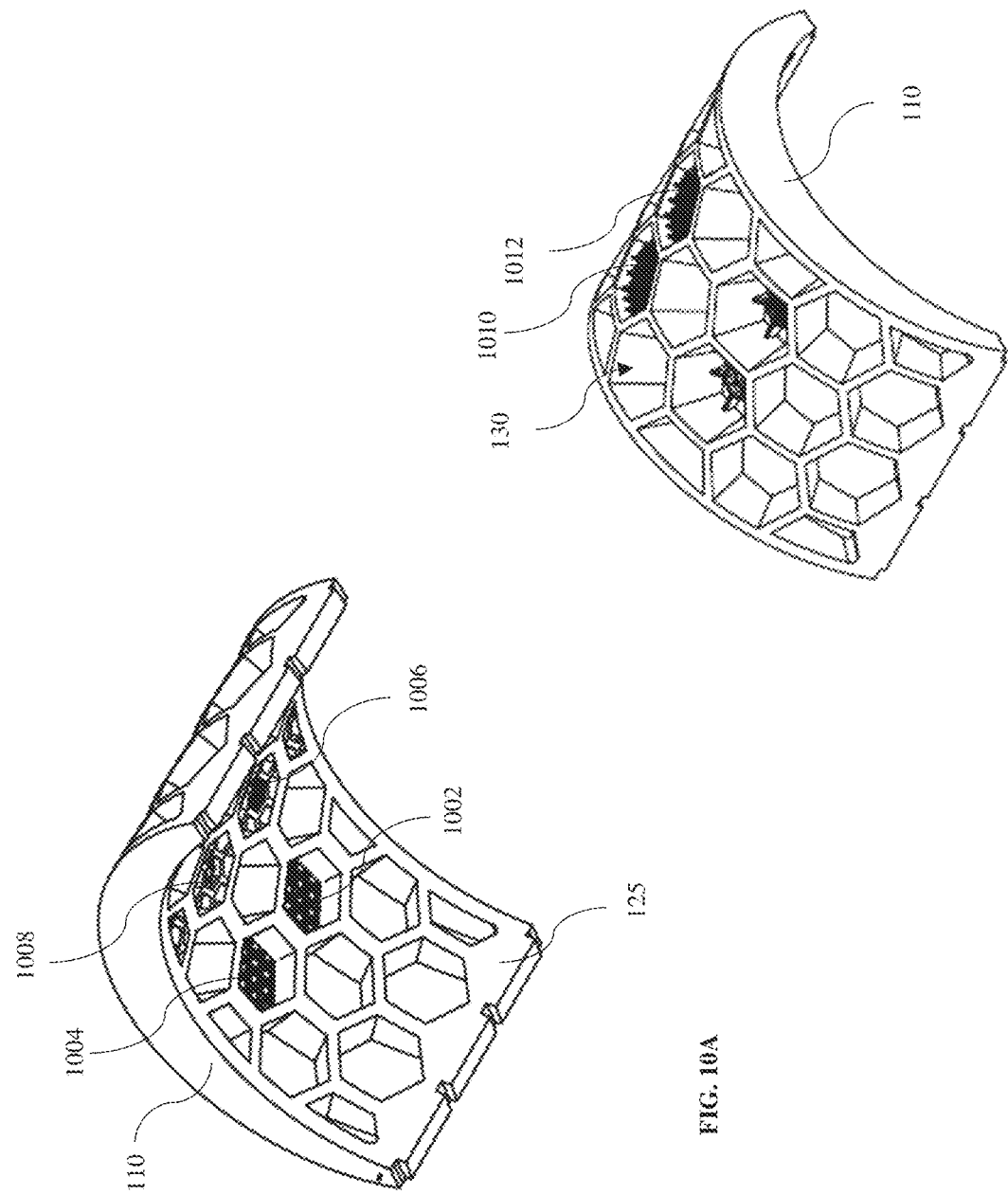

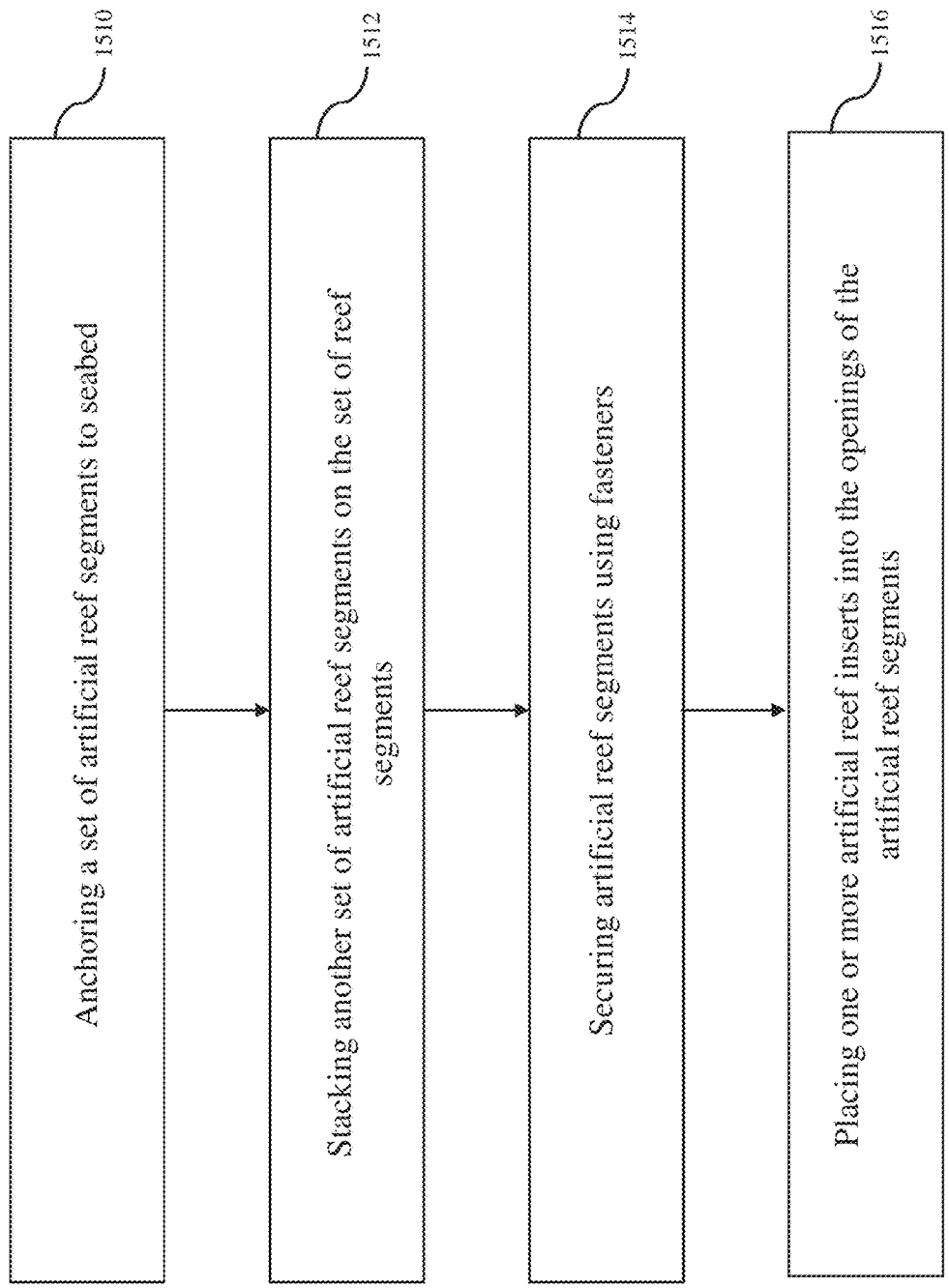

ARTIFICAL REEF STRUCTURE

REFERENCE TO RELATED APPLICATIONS

This application is a non-provisional which claims the benefit of the filing date of U.S. Provisional Application Ser. No. 63/465,937 titled "Artificial Reef Structure" and filed May 12, 2023 and the subject matter of which is incorporated herein by reference.

CROSS-REFERENCES

Not applicable.

TECHNICAL FIELD AND BACKGROUND OF THE INVENTION

Existing reefs face numerous issues that compromise the sustainability of the reefs. The issues include increasing levels of carbon dioxide that not only contributes to global warming but also leads to ocean acidification. Acidic waters inhibit the ability of corals to grow and survive. Industrial and agricultural waste introduce pollutants such as sediment, nutrients, and chemicals into reef environments. This pollution can damage corals, and marine life and impact marine habitat. Further, many coral reefs lack proper protection through marine reserves or protected areas. Without designated zones where fishing and other activities are regulated, reefs are more vulnerable to degradation. The degradation of the reefs pose significant risks to marine life, and preservation efforts are necessary to address these issues.

The present disclosure relates to the field of man-made marine structures (MMS), and more specifically to the field of artificial reefs. Man-made marine structures refer to any artificial structures that are placed in marine environments for various purposes such as coastal protection, navigation, resource exploitation, and environmental management. With the advent of modern engineering techniques and materials, man-made marine structures have become more sophisticated and diverse. They now include structures such as offshore oil and gas platforms, underwater tunnels, artificial islands, artificial reefs, and marine renewable energy devices. The design and construction of man-made marine structures require expertise in various engineering disciplines, including civil, mechanical, electrical, and marine architecture.

Artificial reef structures are man-made underwater structures that mimic natural reefs and are designed to enhance marine habitats, increase fish populations, protect coastal areas, and provide benefits to local communities. Artificial reefs provide a range of benefits to marine ecosystems, from providing shelter and food for fish and other marine species, to reducing pressure on natural reefs that are threatened from overfishing, climate change, and other human activities. Furthermore, artificial reefs can significantly impact the effects of wind waves and swell, wind surges, and sea waves of seismic origin (tsunamis). For example, artificial reefs can cause waves to break and change direction as they pass over leading to changes in wave height, wave energy, and wave direction.

One of the most significant effects of artificial reefs is the creation of sheltered areas behind said reef, known as a lee zone. Lee zones are protected from the full force of waves and can create a calm area for boats, swimmers, and other marine activities. In addition to lee zones, artificial reefs can provide protection to coastal areas by reducing erosion and protecting shorelines. Further benefits of artificial reefs include greater surface area in both vertical and horizontal directions for attachment of marine organisms and promotion of healthy predator prey dynamics. The need for artificial reefs is apparent, and products have surfaced on the market. However, the prior art lacks a critical feature for connecting these artificial reefs to one another, not only for installation but for transportation of these man-made marine structures. Furthermore, much of the prior art fails to combat seabed scouring. Seabed scouring is a major challenge in the industry of artificial reefs. As a current or wave flows over or through a structure, there is some degree of erosion around that structure. This can lead to destruction of marine habitats, damage to the structure, displacement of marine species, or release of pollutants.

In addition to reef conservation, shorelines represent a critical interface between land and sea, playing a vital role in coastal ecosystems and human society. They are dynamic environments, constantly shaped by the interaction of waves, tides, and sediment. The natural features of shorelines, such as beaches, dunes, and wetlands, provide essential services including coastal protection, habitat for diverse wildlife, and recreational spaces for human activities. However, these ecosystems are increasingly threatened by human-induced changes and natural processes.

One of the primary challenges facing shorelines is erosion—a natural process exacerbated by factors such as rising sea levels due to climate change, storm surges, and human activities like construction and dredging. Erosion can lead to the loss of valuable land, damage to property, and the disruption of natural habitats. Traditional responses to shoreline erosion, such as the construction of seawalls and groins, often involve rigid structures that can actually exacerbate erosion in adjacent areas and do not provide habitat for coastal species.

In response to these challenges, the concept of "living shorelines" has emerged as a sustainable alternative. Living shorelines use natural elements, such as plants, sand, and rocks, to stabilize and protect coastal areas. This approach not only prevents erosion but also maintains, or even enhances, the natural ecosystem functions and biodiversity. Unlike hard structures that can degrade over time and require significant maintenance, living shorelines can adapt to changing conditions and become more robust as they mature.

Living shorelines typically incorporate a variety of ecological components and considerations, such as native vegetation, which stabilizes sediment and provides habitat for wildlife, oyster reefs or other natural features that buffer against wave action and provide habitat for marine species, and gradual slopes that absorb wave energy better than vertical structures. The benefits of living shorelines extend beyond erosion control. They improve water quality by filtering pollutants, offer habitats for a wide range of species, and maintain the aesthetic and recreational value of coastal areas. Moreover, living shorelines can sequester carbon, contributing to the mitigation of climate change impacts.

The implementation of living shorelines requires a careful balance of engineering, ecology, and stakeholder engagement. Each living shoreline project is unique, tailored to the specific conditions and needs of the local environment. This approach represents a shift towards more sustainable and environmentally friendly coastal management, recognizing the importance of working with natural processes to protect and enhance our shorelines.

As a result, there exists a need for improvements over the prior art and more particularly for a more efficient artificial reef system having a plurality of segments that may interlock without transferring destructive loads for stabilizing soil for accretion and retention of coastal water soil and for providing a water barrier, breakwater, and artificial habitation for marine life.

BRIEF SUMMARY OF THE INVENTION

An artificial reef system for stabilizing soil for accretion and retention of coastal water soil and for providing a water barrier, breakwater, and artificial habitation for marine life is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an artificial reef system for stabilizing soil for accretion and retention of coastal water soil is disclosed. The system comprises a plurality of artificial reef segments, where each segments comprises a homogenous curved frame structure having a vertex section, an outer curved surface and an inner curved surface, a plurality of openings extending through the homogenous curved frame structure from the outer curved surface to the inner curved surface, a plurality of frame segments and each frame segment is defined by a portion of the outer curved surface adjacent to one of the plurality of openings, and a plurality of cutouts disposed along a terminating end of each artificial reef segment. This frame structure allows sunlight to reach within the structure and water flow to circulate plant and animal material promoting coral growth.

In one embodiment, an artificial reef configuration is disclosed having a first reef segment arranged on top of a second reef segment and a third reef segment in such a way that the cutouts of the first reef segment receive at least one of the pluralities of frame segments of the second reef segment and the third reef segment. This configuration, being modular, strengthens each reef segment to resist wave action in a fashion that is exponentially compounding. This modular system is conducted in such a way that the segments may be arranged in a corrugated fashion to produce internal turbulence and wave diffusion/destructive wave pattern. A transport configuration is also disclosed including a first reef segment stacked on top of a second reef segment such that the vertex section the first artificial reef segment is adjacent to the vertex section of the second artificial reef segment. This invention allows for open water circulation and light penetration promoting spat recruitment and oyster development while encouraging the growth of healthy phototrophic organisms.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIGS. 10A, 10B, 10C, 10D, 10E and 10F illustrate various views of reef inserts disposed within openings of artificial reef segment, according to an example embodiment;

FIGS. 15A, 15B and 15C are block flow diagrams for configuring artificial reef structure, according to an example embodiment.

Figure 1:
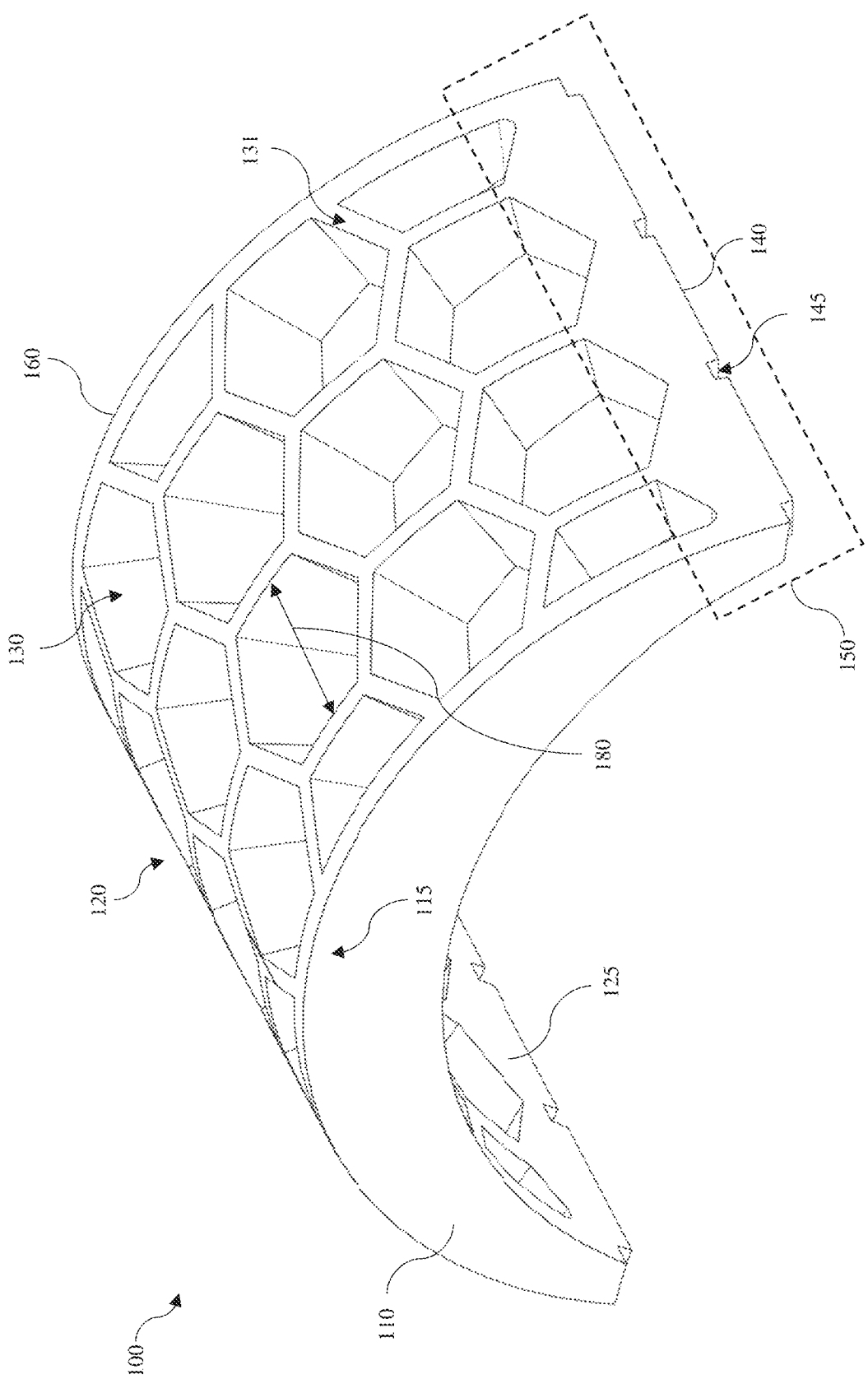
FIG. 1 is a front isometric view of a first artificial reef segment, according to an example embodiment.

In the context of the present disclosure, it is understood that the figures provided are drawn to scale. This aspect is fundamental in accurately conveying the design and dimensions of the artificial reef segment and its system. The scaled figures offer a precise representation, essential for those involved in manufacturing, implementation, and scientific evaluation of the system. That said, it is further understood that other embodiments, proportions, and dimensions may exist that fall within the spirit and scope of the disclosure. While the figures are presented to scale for clarity and precision, they do not limit the extent of the concepts and innovations encompassed by the disclosure. Variations in design, size, and configuration that adhere to the underlying principles and functionalities of the artificial reef system are considered to be within the ambit of this disclosure.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an artificial reef system for stabilizing soil for accretion and retention of coastal water soil and for providing a water barrier, breakwater, and artificial habitation for marine life. The disclosed system includes an artificial reef configuration allowing each reef arch structure to be stacked or connected to one another creating a dense and complex reef shape and system. Furthermore, the disclosed system includes a transportation configuration allowing each artificial reef segment to be easily stacked and stored on top of one another, saving space and transportation resources for the user. In the transport configuration, a first artificial reef segment substantially abuts a majority of the outer curved surface of a second artificial reef segment. The disclosed embodiments provide a zigzag pattern of the artificial reef segments that improves water circulation by creating areas of eddies and turbulence. This turbulence helps to oxygenate the water and improve nutrient distribution for growth of coral and other organisms.

The disclosed embodiments improve upon the prior art by providing simplified configuration of reef inserts and artificial reef segments having secure attachment, preventing the inserts from shifting or becoming dislodged over time. The design of the artificial reef segments makes it easier to insert and position reef inserts within the openings during the installation process. The disclosed embodiments provide additional surfaces provided by these inserts to serve as attachment points for marine organisms, promoting the settlement of coral, algae, and other fauna. The increase in surface area provides increased biodiversity and ecological functionality within the artificial reef system. The disclosed embodiments boost natural coral reefs by providing an additional substrate for coral larvae to attach and grow. The disclosed embodiments can create new habitats that can mimic the conditions suitable for coral settlement and development, expanding the available living space for marine organisms. Such artificial reef segments promote biodiversity by providing shelter and feeding grounds for a variety of marine species. These structures attract fish, invertebrates, and other organisms, contributing to a more diverse and resilient ecosystem. This increased biodiversity contributes to the overall health and resilience of living shorelines, creating a balanced ecosystem with ecological interactions that benefit both flora and fauna.

The presence of artificial reef structures can facilitate sediment deposition, contributing to the natural buildup of sediments in coastal areas. This is important for maintaining the topography of living shorelines and supporting the growth of vegetation. The disclosed embodiments improve upon the prior art by providing steel attachments such as rods that partly protrude out from side surface of the artificial reef segments. These steel attachments facilitate in lifting the reef segments during placement or transport of the reef segments and for securing the reef segments to other reef segments for reef structure. Additionally, the disclosed embodiments improve upon the prior art by providing openings pattern on the artificial reef segments to accommodate the natural growth patterns of mangrove roots, providing a supportive structure. The disclosed artificial reef segments provide protection to mangrove roots against erosion and physical disturbances.

The artificial reef segment, along with the system comprising multiple segments, embodies a significant leap forward in the field of oceanic and environmental conservation, addressing a broad spectrum of ecological challenges. As a living shoreline, these segments offer superior coastal protection compared to conventional methods. They enable the integration of natural elements like mangrove roots, creating a resilient barrier against coastal erosion and storm surges while fostering diverse marine habitats. When functioning as a standalone artificial reef, the segments mimic natural reef structures, providing complex habitats tailored to various marine species. This capability is a marked improvement over traditional artificial reefs, as it allows for greater adaptability and reconfiguration to suit changing environmental and species needs.

As a reef booster, the segments enhance the health and resilience of existing reef ecosystems. They provide additional surface areas for coral out planting, aiding in reef recovery and offering habitats for reef-dwelling species. This role is particularly vital in the context of protecting fragile ecosystems from physical damages due to human activities or natural events.

One of the key improvements of these segments over existing technologies lies in their adaptability. The ability to customize the reef structure with various inserts allows for specific environmental and species considerations, addressing a wide range of oceanic and environmental conservation needs. This adaptability is crucial for targeted interventions in diverse marine environments. Additionally, the design of these segments facilitates easier installation and maintenance, enhancing the efficiency of reef restoration and conservation projects. This not only reduces the resources and time required but also makes it a more practical option for large-scale environmental initiatives.

Furthermore, the structural integrity and durability of these segments promise long-term ecological benefits, positioning them as a sustainable solution in marine conservation. Altogether, the artificial reef segment system represents a comprehensive and versatile tool in the preservation and enhancement of marine environments, be it as part of a living shoreline, as an independent artificial reef, or as a booster to existing reef ecosystems.

Referring now to the Figures. FIGS. 1-6 represent an artificial reef system 100 for stabilizing soil for accretion and retention of coastal water soil and for providing a water barrier, breakwater, and artificial habitation for marine life. The artificial reef system includes a plurality of artificial reef segments. Each reef segment comprises a homogenous curved frame structure 110, a plurality of openings 130 extending through the curved frame structure, a plurality of frame segments 140, and a plurality of cutouts 145. As shown in FIG. 1, this particular design combats the issue of seabed scouring such that its leading edge is a low profile open face allowing for redirection of currents with minimal destructive Eddie spawning. This design greatly improves upon the prior art by increasing the longevity and security of the structure once placed on the sea bed. As disclosed herein, the artificial reef segment has an integrated structure. In certain embodiments, the artificial reef segment may comprise multiple components that are joined or coupled together. For example, the reef segment may have two side walls (curved structure) and a central frame having the openings. The two side walls, and the central frame may be assembled by coupling with each other to form the artificial reef segment. The components may be combined using mechanical fasteners, such as nuts, or bolts. In another example, the components may be combined using sliding rail type attachment where the central frame has extended tabs on both sides and the two side walls have grooves to receive the extended tab.

FIG. 1 represents a first artificial reef segment 160. The homogenous curved frame structure 110 includes a vertex section 115, an outer curved surface 120, and an inner curved surface 125. In the present embodiment the frame structure has a side cross-sectional shape of an arch. The homogenous frame structure may be described as a load bearing structure composed of interconnected members of the same material providing stability, strength, and uniform appearance. The homogenous frame structure normally has symmetrical geometry or uniform structure making them easier to analyze and design. Because the frame structure is made of the same materials having the same material properties and cross-sectional shape, the behavior of the structure can be predicted more accurately when designing for specific loads and conditions. Another benefit of having homogenous frame structures is reduced maintenance. Because the members of the homogenous frame have the same properties, they should wear at the same rate, reducing the need for maintenance and repair.

The vertex section 115 or apex section may be defined as the portion of the frame structure where the curve of the frame structure changes from sloping upward to sloping downward. Also known as the apex or top portion of the arch. In the example embodiments, shown in FIGS. 1-4, the vertex section is rounded at the highest point of the homogenous frame structure. In other embodiments, the vertex may appear differently. For example, in other embodiments the vertex section may plateau forming a planar surface along the highest point of the frame structure. In other embodiments, the vertex may come to a rigid point. It is also possible for the frame structure to have multiple vertices of varied sizes and shapes.

The outer curved surface 120 of the frame structure may be defined as the outermost portion of the structure following a continuous path forming a curve. In some embodiments, the outer curved surface may be textured and rough facilitating the attachment of marine organisms. Similarly, the inner curved surface 125 may be defined as the part of the structure facing inward towards the center of the structure following the same or a different curved path of the outer curved surface. The inner and outer curved surface may be defined by a mathematical function or equation taking on different shapes from simple curves such as circles or ellipses to more complex curves like parabolas. The curvature of each curved surface may vary in magnitude or may be identical to each other. The outer curved surface 120 and inner curved surface 125 may be formed by the same material as the frame structure or may be formed from a different material with different texture or properties. Each artificial reef segment is homogenous such that it comprises a uniform structure and same material. The material used for the artificial reef segment may be reinforced, or have other materials embedded within or combinations of materials. Examples of such material may include, Concrete reinforced with fibers such as glass, polypropylene, or steel, Stainless Steel Structures, Fiber-Reinforced Polymers (FRP), Reinforced Plastics, and reinforced marine-grade concrete, Metal Matrix Composites (MMCs). In some embodiments, the homogenous curved frame structure 110 may be created from materials such as concrete, limestone, metal, rock, organic materials such as bamboo, artificial reef modules, and acrylic polymer and alumina trihydrate (ATH), derived from bauxite ore. In other embodiments, the system may be comprised of a uniform material, meaning that the entire structure is composed of the same substance throughout. This uniformity ensures consistent properties such as strength, durability, and resistance to environmental factors across the entire segment or insert. The concrete material may be made using recycled materials such as crushed glass, fly ash, or slag. This reduces the demand for new materials and helps to recycle waste. In an embodiment, the material used for the homogenous curved frame structure may be eco-friendly polymers that are specifically designed to be environmentally friendly. These polymers can be used to create artificial reef segments that mimic natural coral structure. The manufacturing processes used to create these frame structures may include extrusions, molding, casting, welding, punching, folding, 3D printing, CNC machining, etc. The frame structures may be formed from a single piece of material, or several individual pieces joined or coupled together. However, other materials and manufacturing processes may also be used and are within the spirit and the scope of the present invention.

In the fabrication of the reef arch segment and its inserts, the employment of CSA (Calcium Sulfoaluminate) concrete represents an improvement over materials traditionally used in such applications. CSA concrete distinguishes itself through its rapid setting time and high early strength, which are especially advantageous in the marine setting where quick stabilization of structures is imperative. This rapid development of strength ensures that the reef structures can withstand the dynamic and often harsh oceanic conditions soon after installation. In contrast to conventional Portland cement, CSA concrete has a reduced environmental impact due to its lower limestone content and decreased energy requirements for production. This aspect aligns with the growing emphasis on environmental sustainability in material selection. Furthermore, CSA concrete's enhanced resistance to sulfate attack—a prevalent challenge in marine environments ensures greater durability and longevity of the reef segments and inserts. Its adaptability to marine conditions, combined with its environmental benefits, positions CSA concrete as a significant advancement over prior art in the construction of artificial reef systems.

In the artificial reef structure, the materials of the inserts may differ from the main material of the reef segment. This allows for creating a mosaic of inserts, where each insert may be made from different materials, throughout the reef structure. The inserts within the artificial reef segments can be designed as a mosaic, representing a multifaceted and integrative approach to habitat creation. In this context, a mosaic refers to an assembly of different inserts, each comprising different shapes, structures, and/or materials, each forming a distinct piece of the overall system. This diverse composition allows each insert to provide unique environmental conditions suitable for various marine species.

The variation in materials is strategically chosen to cater to specific requirements of different marine organisms, enhancing the habitat's ecological value. Some materials might be selected for their ability to support the growth of specific species or for their textural properties that suit certain marine life better, thereby fostering a rich and varied underwater ecosystem. In certain embodiments of the artificial reef system, in addition to the improvement of the differing material composition the inserts, another improvement involves a single insert comprising different materials in segmented sections, each tailored to support diverse symbiotic species growth. This multifaceted insert structure exhibits a significant advancement over prior art in artificial reef technologies, primarily due to its enhanced ecological functionality and habitat diversity.

Each segment of the insert, distinct in its material composition, may be specifically designed to create unique microhabitats within the reef system. For example, one segment may utilize a porous material like bio-concrete, conducive to the growth of certain coral or algae species, while another segment might be made from a smoother material like recycled plastic, suitable for species preferring less abrasive surfaces. This diversity in material composition within a single insert allows for the simultaneous support of a range of marine species, each with unique environmental needs, thereby fostering a more dynamic and symbiotic marine ecosystem. Similarly, one entire insert may be a porous material whereas another insert located on a separate part of the system may be a smooth material.

This material variability within the system addresses a key limitation of conventional artificial reef systems and/or inserts, which often employ a uniform material composition, thereby limiting the range of species that can be supported. The innovation lies in the ability to create a mosaic of habitats within a single insert, thereby maximizing the ecological potential of the reef system. The varied material composition also potentially affects the local water chemistry and physical conditions, further contributing to the ecological complexity and health of the reef environment and not only enhances the structural complexity and biological diversity of the artificial reef system but also represents a more versatile and effective solution for marine conservation and reef restoration efforts. The ability to accommodate diverse marine life in a single insert structure significantly surpasses the capabilities of traditional artificial reef designs, marking a substantial improvement in the field.

Figure 2:
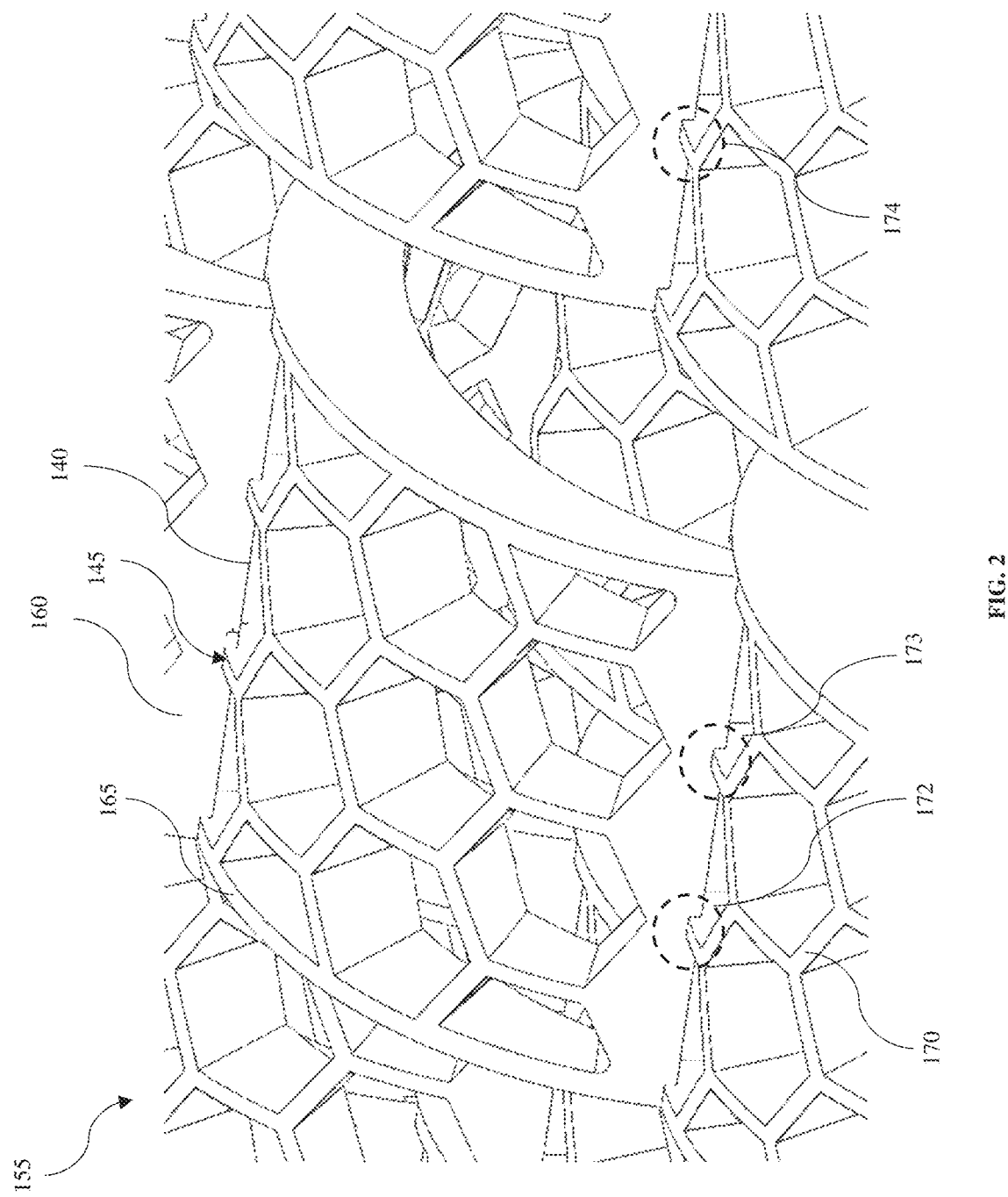
FIG. 2 is an isometric view of an artificial reef configuration having three artificial reef segments connected to one another.
Figure 3:
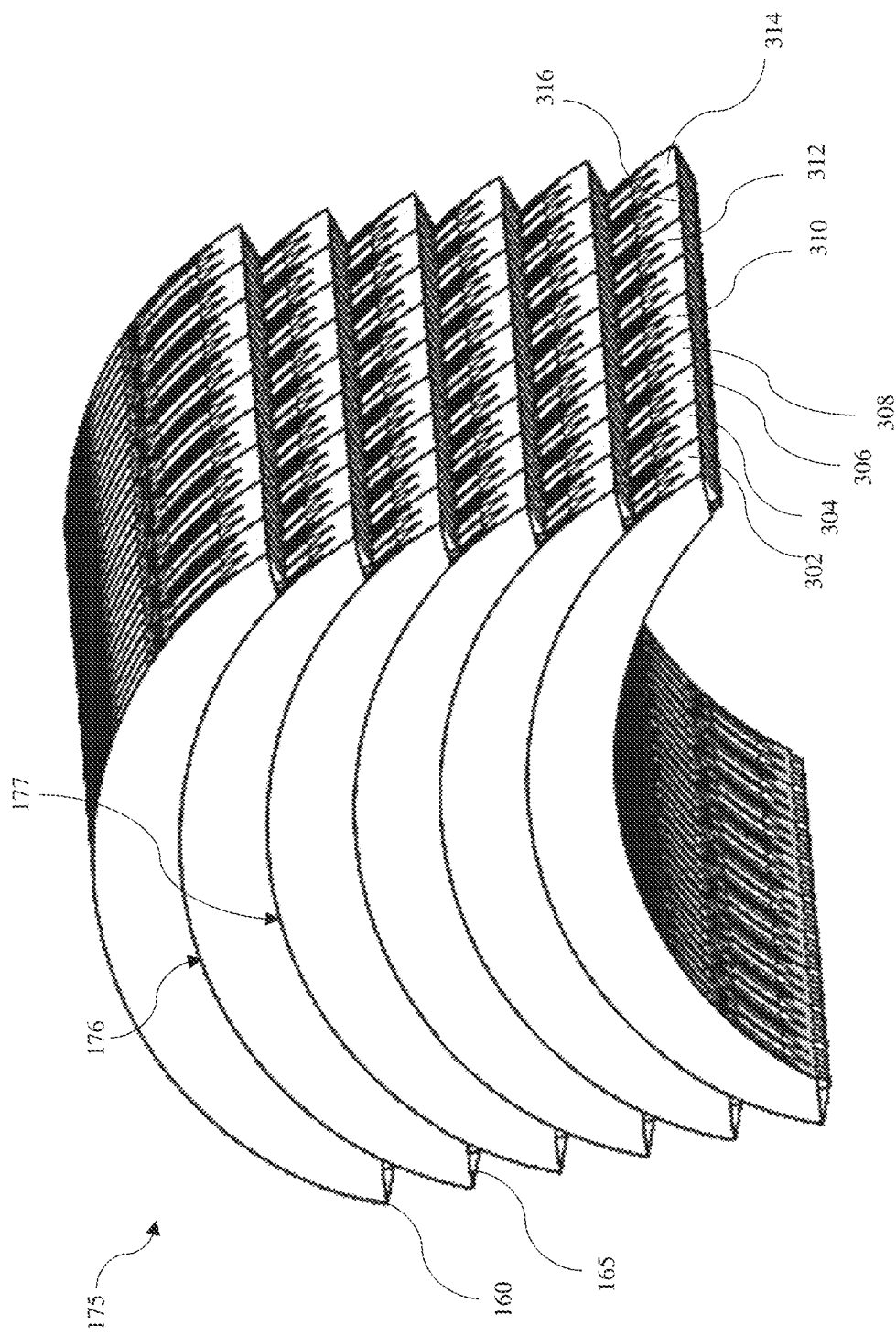
FIG. 3 is an isometric view of a transport configuration having three artificial reef segments stacked upon one another.

The plurality of artificial reef segments also includes a plurality of openings 130 which extend through the homogenous curved frame structure from the outer curved surface to the inner curved surface. In FIGS. 1-3, the openings comprise a hexagonal cross-sectional opening and are placed adjacent to one another spanning across the whole structure creating a grid-like surface. These openings may provide new habitats and shelter for a variety of marine life, increasing the diversity of marine species in the area. The openings may also allow for water flow helping to increase the circulation of oxygen, nutrients, and other essential elements that support the growth of marine life. In the example embodiments shown, such as FIG. 1, there are three openings lined up next to one another spanning from one end of the frame structure to the other. These openings cover the whole artificial reef segment. Whereas, in other embodiments, the openings may be shaped, sized, or spaced differently. For example, in a different example embodiment, the openings may appear circular and may only be placed along the vertex of the structure. As disclosed herein, the openings are shown to have hexagonal cross-sectional opening, it may be understood that other cross-sectional shapes of the openings having more than six sides, such as heptagon, octagon, nonagon, decagon are also covered within the scope of the present invention.

The artificial reef segment, featuring a plurality of openings and/or hexagonal channels, incorporates a well-considered approach to ensure safety for both marine and human life. This approach is exemplified through the utilization of inserts, which serve to modify the openings in areas identified as higher risk.

For human safety, particularly in areas where divers and swimmers are common, the potential for entanglement is a critical concern. The reef segment addresses this by employing inserts, further detailed herein, that can either partially or fully close off these openings. The deployment of a hierarchical structure of openings, with inserts of different sizes and/or having openings of different sizes, allows for the precise adjustment of opening sizes. Some inserts are designed without openings, creating a smooth, flush surface with the segment's outer surface, effectively eliminating any gaps in areas where human interaction is likely.

Concerning marine life, particularly larger species such as juvenile turtles, manatees, and dolphins, the structure provides a safe environment. The customizable nature of the inserts ensures that while the openings are sufficiently large to allow these animals an escape route if they inadvertently swim into them, they also remain small enough to offer a haven from larger predators. This careful balancing act is essential in providing a secure habitat for diverse marine species.

The flexibility in the size and configuration of the openings, afforded by the varied inserts, allows the artificial reef segment to adapt to specific environmental and safety requirements. This feature underscores the segment's ability to offer ecological benefits while simultaneously prioritizing the safety of the marine ecosystem and its human visitors.

Figure 6:
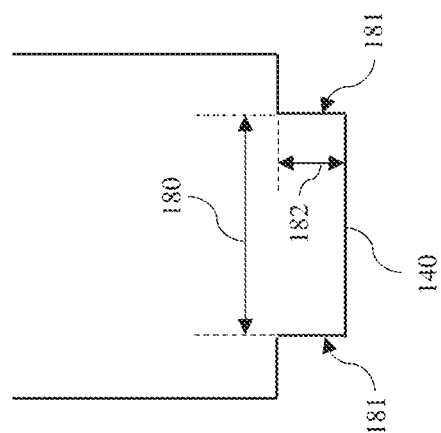
FIG. 6 is a front view of a portion of one of plurality of frame segments, according to a second example embodiment.
Figure 5:
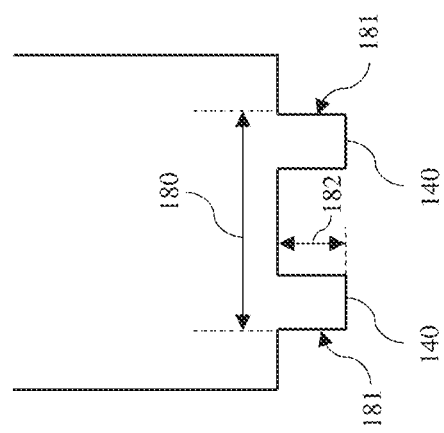
FIG. 5 is a front view of a portion of one of plurality of frame segments, according to a first example embodiment.

The plurality of artificial reef segments further includes a plurality of frame segments 140 where each frame segment is defined by a portion of the outer curved surface adjacent to one of the plurality of openings. The purpose of these frame segments is to function as an attaching element such that a first artificial reef segment 160 may interlock with a second artificial reef segment 165, as shown in FIG. 2. Each frame segment is sized to interlock with the openings of a second artificial reef segment. Each frame segment 140 includes a height 182 and a length 180 (as illustrated in FIGS. 5-6). The outer portions 181 (illustrated in FIGS. 5 and 6) of the frame segments are configured to fit snugly with the openings by use of force, also known as press fitting or interference fitting. As noted above, in the artificial reef configuration, the interlocking section is disposed in between two cutouts of the first artificial reef segment, and is received by the opening of the second artificial reef segment. These fittings are achieved by the normal force acting on the outer portions of the frame segments by the inner portions of the openings, and the normal force acting on the inner portions of the openings by the outer portions of the frame segments. Further embodiments are shown and described below in FIG. 5 and FIG. 6.

A frame segment, in the context of the artificial reef structure or similar construction, can be described as a fundamental component that forms part of the boundary or wall of an opening within the overall structure. Essentially, it acts as a supporting element that defines and maintains the shape and integrity of each opening.

In the structure of the artificial reef segment, each frame segment serves a dual purpose. Firstly, it contributes to the physical framework that outlines an individual opening, helping to create and maintain its specific shape, whether that be circular, hexagonal, or any other geometric form. This is crucial in determining the size and contours of the space through which water, nutrients, and smaller marine organisms can flow, as well as providing surfaces for marine life to adhere to and inhabit.

Secondly, and equally importantly, each frame segment plays a role in the overall stability and robustness of the reef segment. When multiple frame segments are combined, they form a cohesive and interconnected network that adds strength and resilience to the entire reef structure. This interconnectedness allows the structure to withstand the dynamic forces of the marine environment, such as water currents and the physical impact of marine life.

Thus, in the larger context of the artificial reef segment, frame segments are not just individual entities but integral parts of a larger, cohesive structure. They work in unison to provide both the physical form and the structural integrity necessary for the artificial reef to function effectively in its ecological role.

The plurality of artificial reef segments further includes a plurality of cutouts 145 disposed along a terminating end 150 of each artificial reef segment. The terminating end may be defined as the farthest end from the vertex of the segment. In a symmetrical embodiment such as the example embodiments shown, there are two terminating ends. In some embodiments, such as FIG. 1, these cutouts may be sized to fit the portion of material 131 between each hexagonal cross-sectional opening such that the cutout may be inserted onto the portion of material 131 forming a snug fit, as shown with reference to portions 172, 173 and 174 in FIG. 2. In other embodiments, the cutouts may be angled differently applying different pressures to the openings when in contact. It would be noted that the terms hexagonal opening and hexagonal cross-sectional opening are used interchangeably in the disclosed embodiment and refer to the openings 130.

The described cutout on the bottom portion of a reef segment is a specialized feature designed to facilitate the modular assembly of an artificial reef structure. This cutout is essentially a void or an intentionally left-out space, shaped and sized to precisely accommodate a frame segment from another reef segment. Its primary purpose is to enable the interlocking or attachment of multiple reef segments, thereby creating a larger, cohesive artificial reef structure.

The configuration of this cutout is critical for ensuring a secure and stable connection between adjoining reef segments. It must be shaped to correspond exactly to the dimensions and contours of the frame segment it is intended to receive. This precision ensures that, when a frame segment from another reef segment is inserted into the cutout, it fits snugly and securely, minimizing any movement or misalignment.

This interlocking mechanism provided by the cutout and the corresponding frame segment is a key aspect of the reef segment's design. It allows for the easy and efficient assembly of larger reef structures from individual segments. Once connected, the segments collectively contribute to the structural integrity and functional effectiveness of the overall artificial reef.

Furthermore, this design feature facilitates flexibility in the construction and layout of the reef. By enabling segments to be securely attached to one another, the overall shape and size of the artificial reef can be customized according to specific environmental needs or conservation goals. This modularity is particularly beneficial in reef restoration projects, where the artificial reef needs to adapt to varying seafloor topographies and ecological conditions.

Figure 7:
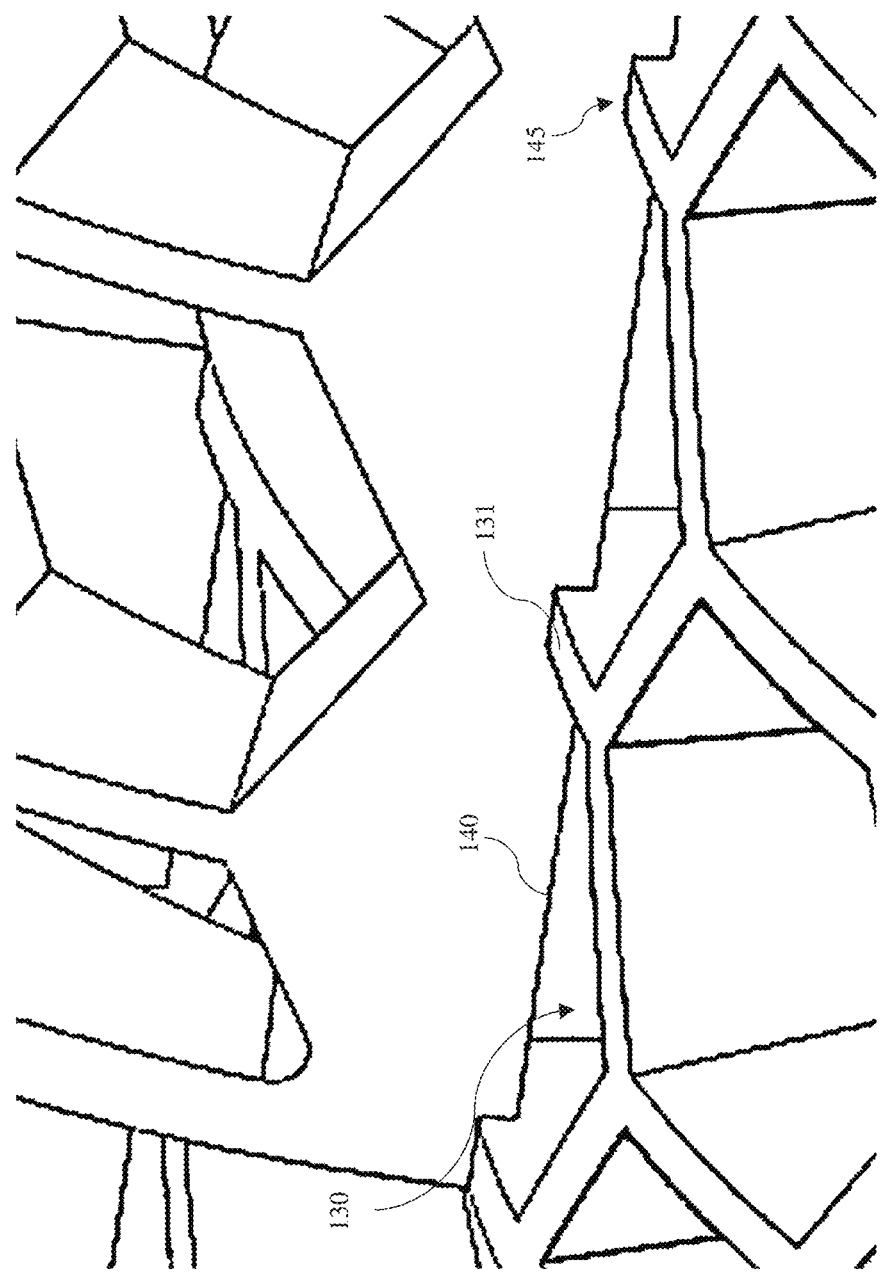
FIG. 7 is a close up view of a portion of a first artificial reef structure connected to a portion of a second artificial reef structure, according to an example embodiment.

FIG. 2 depicts an artificial reef configuration 155. The artificial reef configuration includes a first artificial reef segment 160 arranged on top of a second artificial reef segment 165 and a third artificial reef segment 170 such that at least one interlocking section is disposed where cutouts of the first artificial reef segments receive at least one of the plurality of frame segments of the second artificial reef segments and at least one of the plurality of frame segments of the third artificial reef segment. In an example, two or more artificial reef segments may be arranged on top of a third artificial reef segment by interlocking the two artificial reef segments on the third reef segment. By having each reef segment interlock with one another, the strength and stability of the reef increases providing a safe and protected environment for marine life. Dependent on the purpose or use of the artificial reef system, the quantity of reef segments may vary. For example, if the intended use of the system is to act as a submerged breakwater, the user may require a large number of segments creating a large system of artificial reefs. If the intended use is to support marine growth in an already inhabited area, then the system may only require a few artificial reef segments. A detailed view of how these artificial reef segments interlock with one another is shown in FIG. 7.

FIG. 3 depicts a transport configuration 175 having the first artificial reef segment 160 stacked on the second artificial reef segment 165 such that the first artificial reef segment's vertex section 176 is adjacent to the second artificial reef segment's vertex section 177. Further, multiple artificial reef segments may be stacked in a side by side manner as shown in FIG. 3. For example, the artificial reef segments 302, 304, 306, 308, 310, 312, 314, and 316 are stacked in the side-by-side manner for transporting. This configuration provides several benefits when transporting the artificial reef system. These benefits may include maximizing use of available space in transportation vehicles, increasing amount of cargo that may be transported in a single trip, stabilizing structure reducing risk of damage, reducing transportation costs, etc. When in transport configuration, a majority of the inner curved surface of the first artificial reef segment abuts a majority of the outer curved surface of the second artificial reef segment. In the transport configuration, the inner curved surface of the first artificial reef segment substantially abuts a majority of the outer curved surface of the second artificial reef segment, as shown in FIG. 3. In an example, the first artificial reef segment is stacked on the second artificial reef segment such that the vertex section the first artificial reef segment is adjacent to the vertex section of the second artificial reef segment. As shown in FIG. 3, in the transport configuration, a first artificial reef segment substantially abuts a majority of the outer curved surface of a second artificial reef segment.

Figure 4:
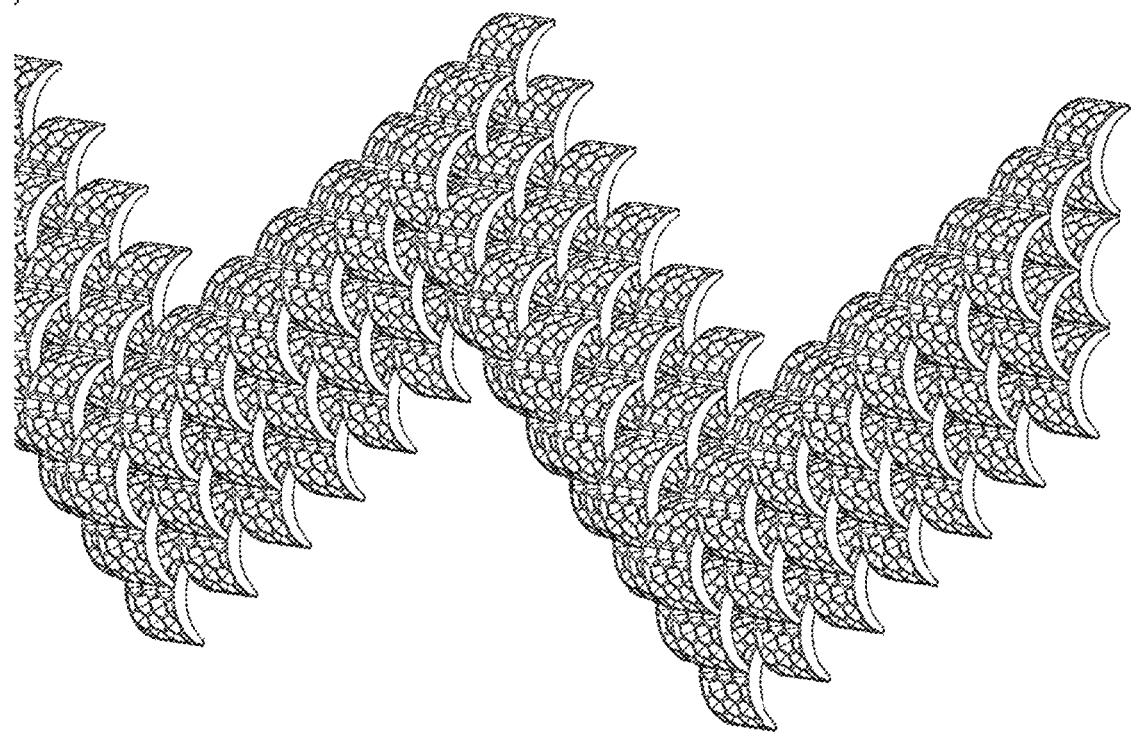
FIG. 4 is an isometric view of the artificial reef system arranged in a zigzag pattern in reef configuration, according to an example embodiment.
Figure 4:
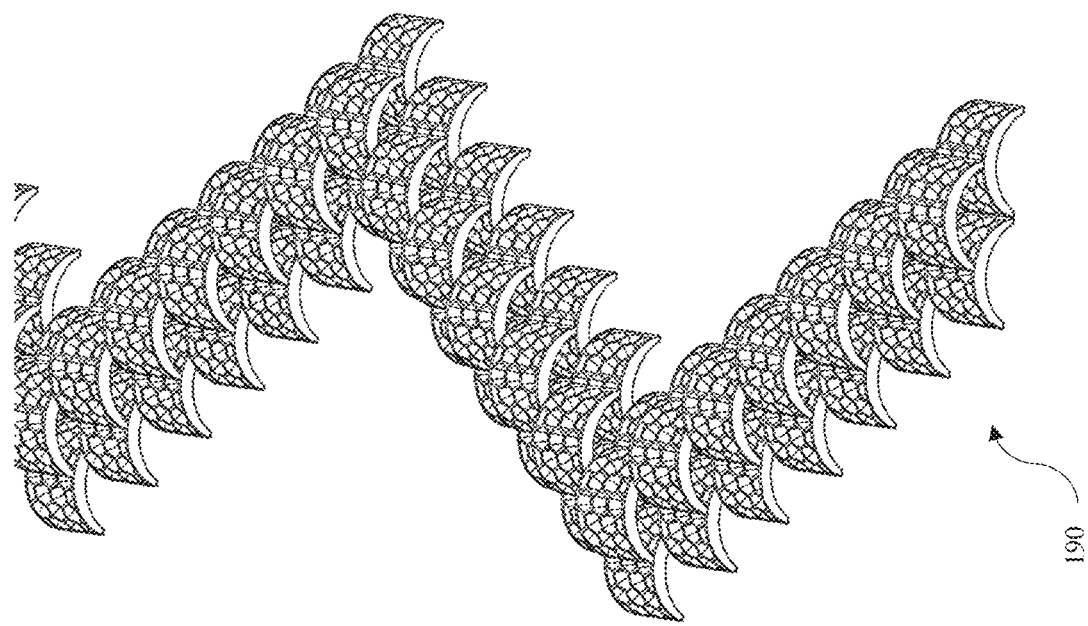

FIG. 4 depicts the artificial reef system 100 comprising a zigzag pattern 190 defined by the plurality of artificial reef segments in the artificial reef configuration. This pattern is extremely beneficial for withstanding and mitigating wave energy. Because each reef segment is connected to form an assembly, the power of a wave cannot destroy any individual arches. The wave energy is reduced as the wave moves through the assembly, but the assembly only realizes the impact of a wave a small amount at a time. Wave attenuation can help protect the shoreline from erosion and damage caused by strong waves and currents. This zigzag pattern can also improve water circulation by creating areas of eddies and turbulence. This turbulence helps to oxygenate the water and improve nutrient distribution, benefiting marine life and promoting the growth of coral and other organisms. This will promote the exchange of water between protected areas and the open ocean helping to maintain a healthy marine ecosystem. As mentioned above, this pattern requires a plurality of artificial reef segments to be connected using frame segments and openings of each artificial reef segment.

Additionally, the zigzag pattern creates more surface area compared to a linear or clustered arrangements. This increased surface area provides more attachment points for marine organisms to settle and grow, enhancing biodiversity and promoting the establishment of a thriving ecosystem. The zigzag pattern can help dissipate wave energy, reducing the impact of strong currents and waves on the reef structure. This can help protect the reef from erosion and damage, ensuring its longevity and stability. The interlocking nature of the zigzag pattern provides increased structural stability to the artificial reef. The segments reinforce each other, reducing the risk of collapse or shifting due to external forces such as currents or storms.

In the contemplated design of the artificial reef system, the strategic arrangement of reef segments in a zig-zag pattern is employed to effectively dissipate wave energy. This configuration, distinct from linear alignments, capitalizes on the angular positioning of each segment to redirect and spread the force of incoming waves across a broader area, thereby diminishing their erosive potential. The zigzag pattern inherently increases the surface area of interaction between the structure and the water, enhancing the system's capacity to absorb and mitigate wave energy. This design consideration not only contributes to the structural integrity of the artificial reef under various oceanic conditions but also plays a significant role in coastal protection, reducing the impact of waves on shorelines. Additionally, from an ecological standpoint, the zig-zag arrangement creates a diverse range of microhabitats within the reef structure, catering to different marine species and thus augmenting the biodiversity supported by the reef. The specific angular placement of the segments within this configuration is crucial for achieving the desired balance between wave dissipation, structural stability, and ecological functionality, underscoring the innovative nature of this artificial reef system design.

FIG. 5 represents a first example embodiment of a plurality of frame segments 140 where each frame segment is rectangularly shaped having a length 180 where length 180 is measured as the distance between the outer portions 181 of a single frame segment (140). Length 180 is also equal to the inner measurement of a single opening (shown in FIG. 1). Having frame segment 140 being the same length as the inner measurement of an opening allows the frame segment to fit securely in the opening. In other embodiments, length 180 may be slightly larger than the inner measurement requiring an interference fit as mentioned above.

FIG. 6 is a second example embodiment of a plurality of frame segments 140 having different shaped frame segments. In this embodiment, the frame segments have the same length 180, measured as the distance between the outer portions 181 so that the frame segments may still fit snugly inside an opening of another artificial reef segment. In this embodiment, the frame segments have removed material from the inner portion of the frame segment leaving negative space in the rectangular segment. This example embodiment reduces the amount of material used and still allows for the interlocking of a frame segment and an opening.

In other embodiments, the frame segments may include a different fastening mechanism. For example, the outer portion 181 of the frame segments may include a ball spring plunger. Ball spring plungers work by applying controlled force and pressure in a specific direction. In this example, the ball or pressure mechanism would be applying pressure to the inside wall of the opening maintaining consistent pressure to keep the two artificial reef segments connected. In an embodiment, the two artificial reef segments may be connected via cylindrical pins that are pressed into the negative space in the rectangular segment, creating a tight and secure fit. The two artificial reef segments can be designed with interlocking tabs that fit into corresponding slots or grooves, creating a snug fit when assembled. In other embodiments, the frame segments may include a more permanent type of fastener such as screws or bolts. In some embodiments the user may prefer each artificial reef segment to be easily detachable in case of an overwhelming force applied to a group of artificial reefs segments oriented in artificial reef configuration 155, in this case the interlocking portion may not be as strong as a connection with permanent fasteners.

Figure 8:
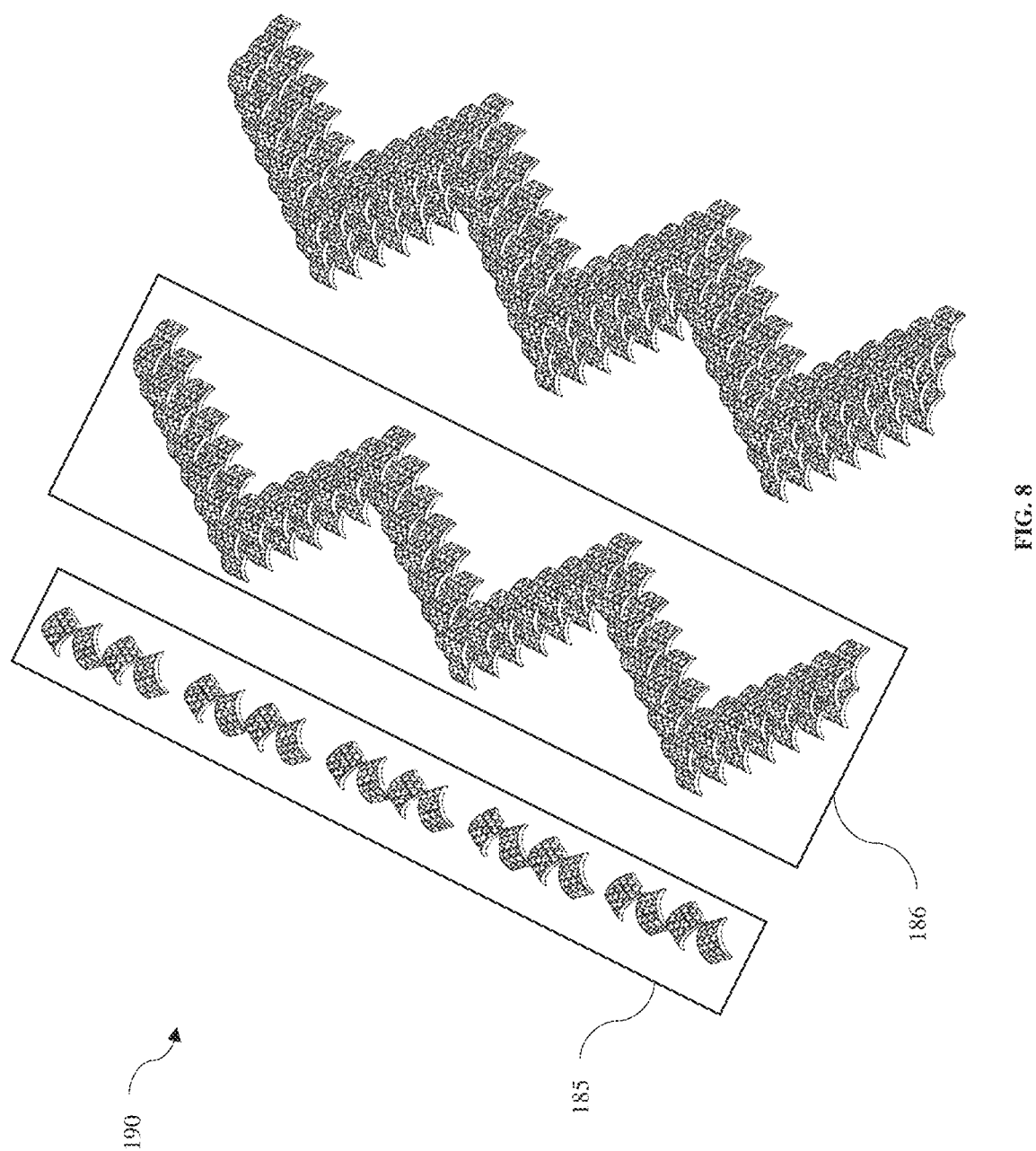
FIG. 8 is an isometric view of the artificial reef system arranged in a zigzag pattern in reef configuration, according to a second example embodiment.
Figure 9:
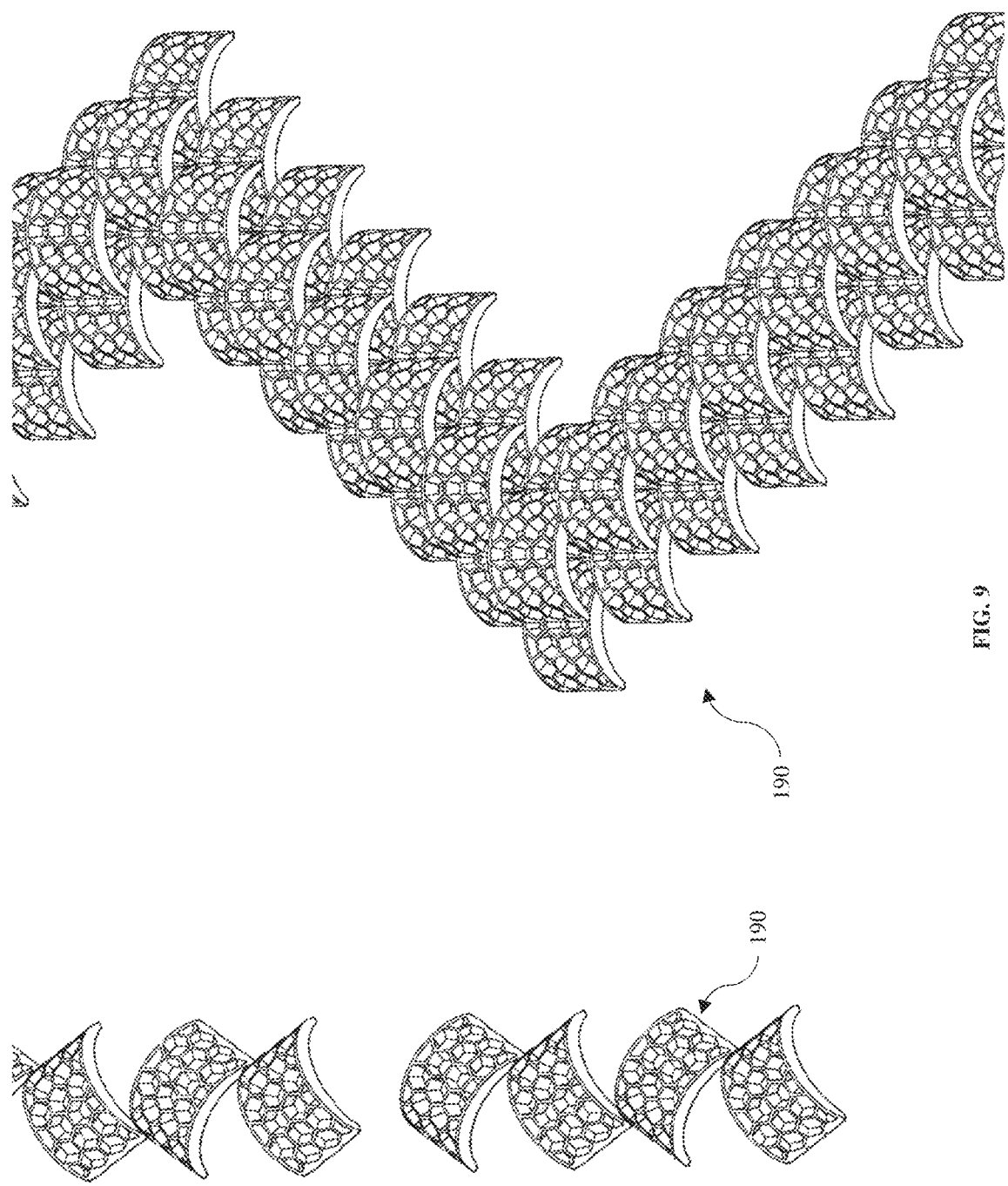
FIG. 9 is an isometric view of the artificial reef system arranged in a zigzag pattern in reef configuration, according to a third example embodiment.

FIG. 8 and FIG. 9 depict the artificial reef system 100 comprising a zigzag pattern 190 defined by the plurality of artificial reef segments in the artificial reef configuration. As mentioned before in FIG. 4, utilizing a pattern such as zigzag significantly aides the structure when faced with great forces such as strong wave energy. As a wave approaches the artificial reef configuration in zig zag pattern, the first point of contact is the first line segments 185. These artificial reef segments will dissipate the wave energy. As the wave continues forward, it will reach the second line segments 186. The first point of contact will be the peaks of the zigzag pattern. As the wave energy is forced upon these peaks, the energy will flow through each artificial reef segment in pattern dissipating at every segment. In comparison to a linear configuration, the zigzag configuration is more effective and reliable due to its behavior as an assembly only realizing the impact of a wave a little at a time. However, other configurations or patterns may also be used with the artificial reef system and is within the spirit and the scope of the present invention.

In an embodiment, the artificial reef system comprises artificial reef inserts configured for being retained within the plurality of openings of the artificial reef segments. The reef inserts are specialized structures or modules designed to fit and be secured within the openings of artificial reef segments. In an example, the reef inserts may be retained by removably fitting inside the openings of the reef segments. The artificial reef inserts may be reinforced and/or further secured within the opening using adhesive to prevent uplifting of the reef inserts. The adhesives may be water resistant and corrosion resistant, such as marine epoxy resins, polyurethane marine sealants, marine silicone sealants. The openings have depth, and the reef inserts are placed within the depth of the openings.

The artificial reef inserts within the reef system are equipped with pyramidal-shaped protrusions, which serve a crucial role in protecting marine life from predators. The unique pyramidal shape of these protrusions is instrumental in deterring various predators, including different sizes of crabs, by creating a physically challenging terrain that hinders their access to smaller, vulnerable organisms. This geometric design is effective in providing a safer environment for these smaller marine species to thrive.

Additionally, the protrusions on the inserts vary in size, which is essential for supporting a hierarchical ecosystem within the insert. This variation allows for different sizes and types of marine life to find suitable habitats. Smaller protrusions offer refuge to tiny species, while the larger ones can accommodate bigger organisms, fostering a diverse and balanced marine ecosystem.

The design of the inserts also includes strategically placed openings that facilitate water flow. These openings are crucial as they allow the circulation of water through the insert, ensuring that essential nutrients and small organisms can flow through, which is vital for the sustenance and growth of marine life attached to the inserts. The water flow also helps in maintaining optimal water quality and temperature conditions around the reef structure.

Overall, the combination of the protective pyramidal protrusions, varied habitat spaces due to different protrusion sizes, and the inclusion of openings for water flow enhances the ecological functionality of the artificial reef inserts. These features collectively contribute to the effectiveness of the reef system in supporting a diverse and thriving marine ecosystem, aiding in both the restoration and conservation of reef environments.

The artificial reef inserts also play a pivotal role in facilitating coral out planting and oyster growth. The pyramidal protrusions on the inserts, varying in size, provide an ideal substrate for coral out planting. The increased surface area of the pyramidal structures having multiple wings offer multiple attachment points for young coral fragments, which is essential for their initial establishment and growth. The varied sizes and shapes of the protrusions cater to different coral species, accommodating their specific growth patterns and size requirements. This design feature ensures that a variety of coral species can be successfully out planted and nurtured on the inserts, contributing to the biodiversity and resilience of the reef system.

In addition to supporting coral growth, the artificial reef inserts are conducive to oyster colonization. Oysters require sturdy and complex surfaces for attachment, and the textured surface of the inserts, especially the pyramidal protrusions, provides an ideal environment for oyster larvae to settle and grow. The presence of oysters on these inserts is particularly beneficial as they are natural water filterers, thus contributing to the overall health of the marine ecosystem by improving water quality. The strategic placement of reef segments offshore, yet within proximity to coastal areas, is aimed at facilitating oyster recruitment. By positioning these segments in locations that are accessible to oyster larvae, yet sufficiently offshore to avoid direct human impact and coastal disturbances, the reef structure provides an optimal environment for oyster colonization and growth. The proximity to shore ensures that the segments are within the range of natural oyster larvae dispersal, which is crucial for the successful establishment and development of oyster populations. This arrangement not only contributes to the restoration and conservation of oyster habitats but also enhances the ecological benefits of the reef segments, such as water filtration and shoreline protection, provided by a thriving oyster population. The careful consideration of location in relation to oyster recruitment demonstrates a thoughtful approach to maximizing the ecological impact of the artificial reef system.

The openings in the inserts facilitate the flow of water, which is crucial for both coral and oyster development. This water flow brings in essential nutrients and oxygen, while also allowing for the passage of small organisms that form part of the food chain. For corals, the flow of water helps in the removal of waste products and delivers phytoplankton and other microscopic food sources. For oysters, the water flow ensures a steady supply of plankton, their primary food source.

Additionally, for instance, the reef inserts may be made from an environmentally friendly materials, such as textured ceramic tiles or specially designed habitat structures and are fitted into the openings of artificial reef segments to create a more intricate and habitat rich environment for marine life, including invertebrate and other lifeforms and provides protection from a plurality of predators. The structure provides hiding spots and shelters where smaller fish and invertebrates can take refuge, making it more challenging for predators to locate and capture them. The reef inserts retained within the openings of artificial reef segments operate by adding complexity and diversity to the reef structure. The additional surfaces provided by these inserts serve as attachment points for marine organisms, promoting the settlement of coral, algae, and other fauna. This, in turn, contributes to increased biodiversity and ecological functionality within the artificial reef system.

FIGS. 10A, 10B, 10C and 10D illustrate the reef inserts 1002, 1004, 1006, 1008, 1010, and 1012 are inserted withing the respective openings 130 of the artificial reef segments. As shown, the reef inserts may have different shapes, such as hierarchical webbings, star pattern, inserts with pyramidal protrusions. In the figures, the reef inserts 1002 and 1004 have star pattern, the reef inserts 1006, 1008 have hierarchical webbings, and the reef inserts 1010 and 1012 have pyramidal protrusions. In an example, the reef inserts 1002 and 1004 are the rear side of the reef inserts 1010 and 1012. The pyramidal protrusions have structures that extend from the base of the reef insert towards the opening of the reef insert partially along the depth of the opening and have substantially pyramidal shape, as shown with reference to FIGS. 11A, 11B, 11C, 11D and 11E. Each of the reef inserts have a base structure 1102 and pyramidal structures that protrude from the base structure having a first side and a second side. The objective of such a structure is to provide more surface area and a denser structure for the marine organisms to attach and grow. In an example, the base structure is configured for providing water flow from the first side of the base structure to the second side of the base structure.

Figure 11A:
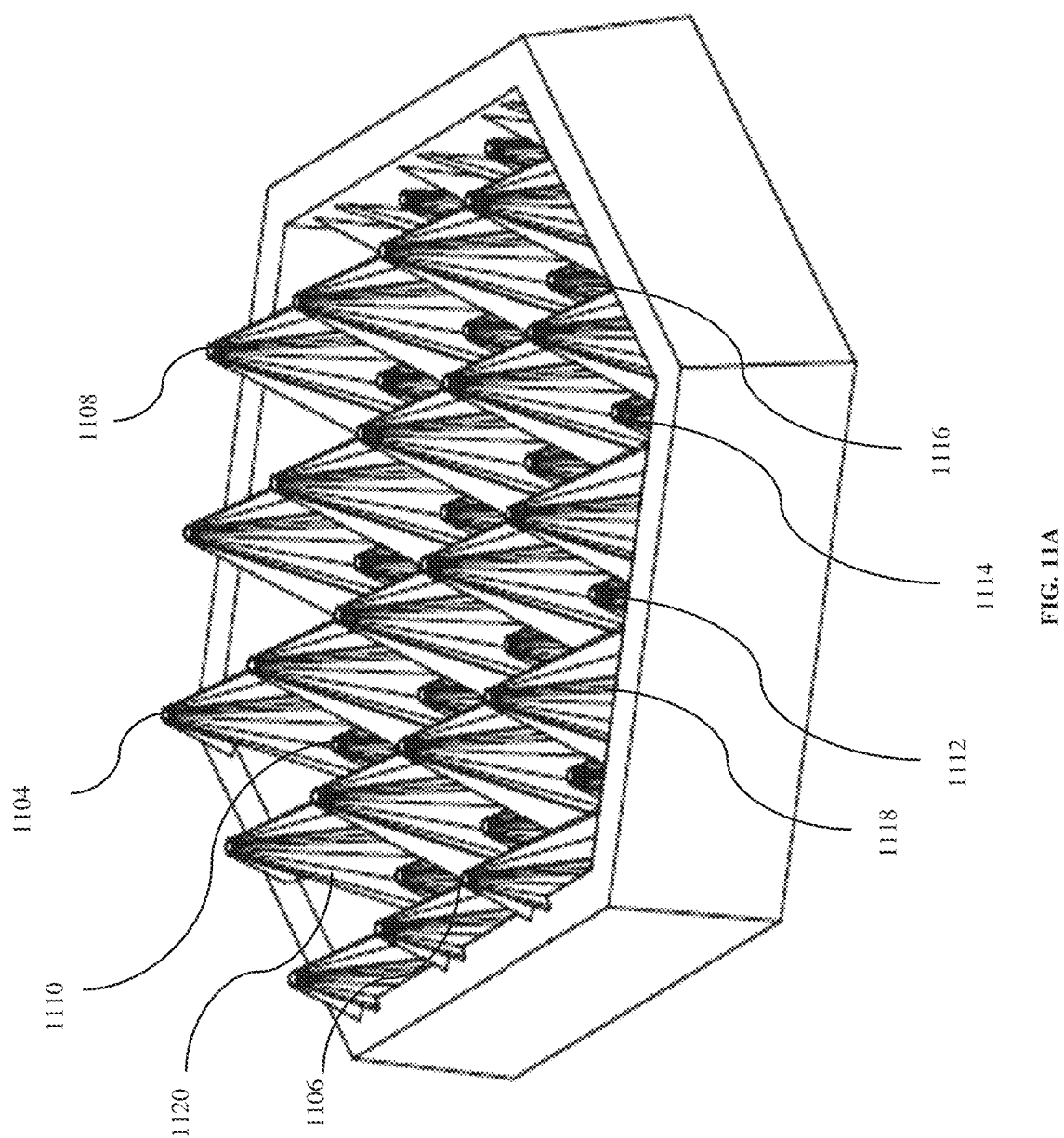
FIGS. 11A, 11B, 11C, 11D and 11E are various schematic views of reef inserts, according to an example embodiment.
Figure 11B:
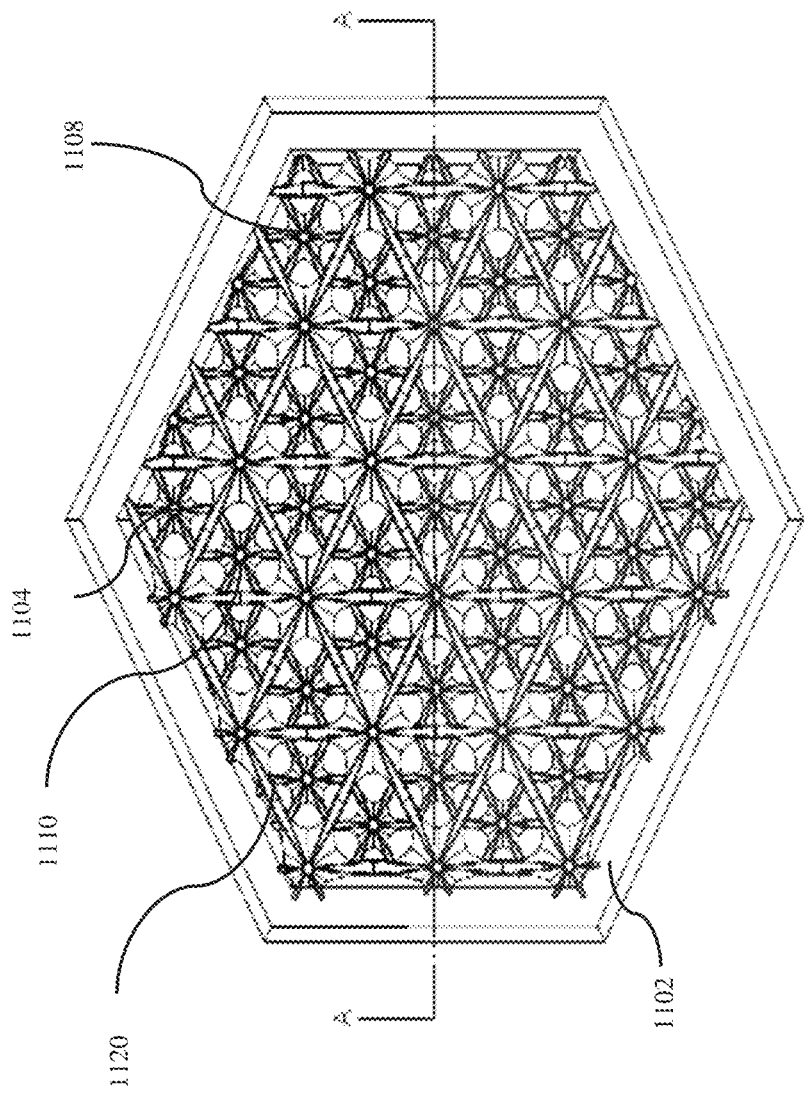
Figure 11C:
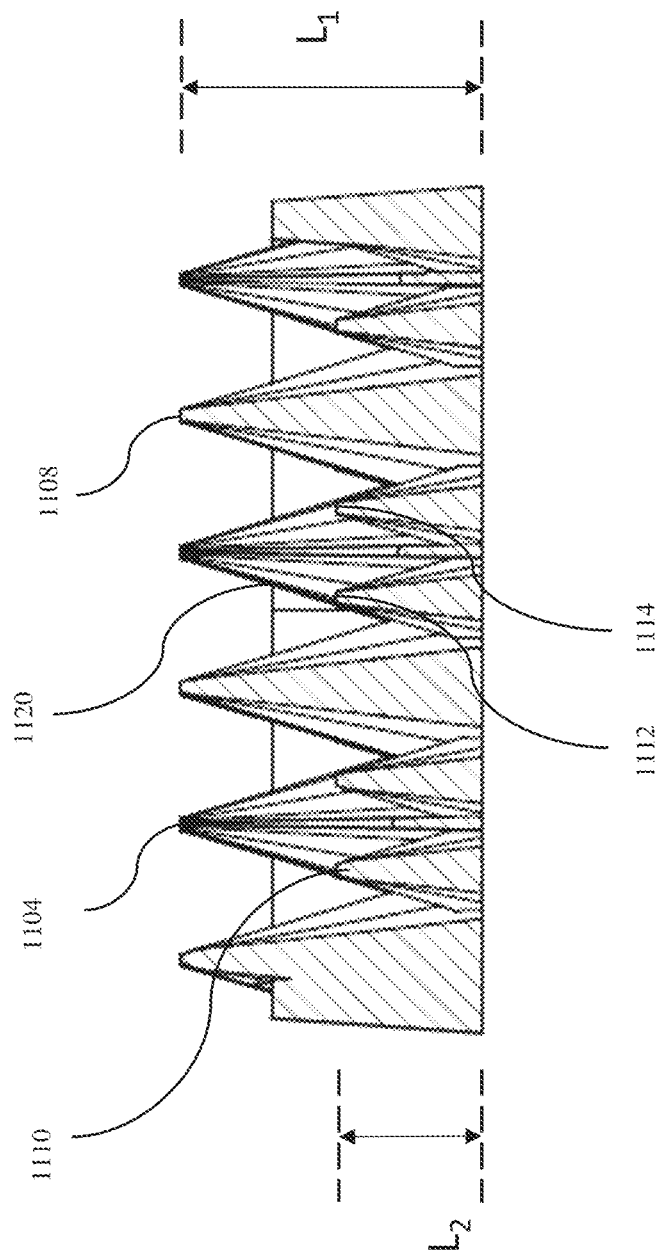

FIG. 11B shows a top schematic view of an insert with pyramidal protrusions. The pyramidal protrusions also have wing structures that protrude from these pyramid protrusions to provide a complex dense structure having an increased surface area of the pyramidal protrusions. As shown, the reef insert has the base structure 1102 on which the pyramidal structures are set, also referred to as the first side of the reef insert. The pyramidal protrusions have substantially pyramidal shape as noted above. FIG. 11C illustrates a sectional view of the insert with pyramidal protrusions along a plane AA shown in FIG. 11B. The reef insert has a plurality of first elongated protrusions extending upward from the first side of the base structure, wherein each of a plurality of first elongated protrusions define a first length $L_1$, and a plurality of second elongated protrusions extending upward from the first side of the base, wherein each of a plurality of second elongated protrusions define a second length $L_2$, wherein the second length is less than the first length. Further, the reef insert has an apex defining by a terminating end of each of the plurality of first protrusions and second protrusions and at least one wing extending along each of the plurality of first protrusions and second protrusions.

As shown, the reef insert has apex 1104 for each of the pyramidal protrusions, first protrusions 1106, 1108 and second protrusions 1110, 1112, 1114 and 1116, and wings 1118, 1120 on the pyramidal protrusions. Each of the first and second protrusions have a substantially pyramidal shape. In an example, one pyramidal protrusion can have two or more wings. The first protrusions 1108 extend upward from a first side of the base structure, and each first protrusion has a first length $L_1$ as shown in FIG. 11C. The second protrusions 1110, 1112, 1114 and 1116 extend upwards from the first side of the base, and each second protrusion define a second length $L_2$, and the second length $L_2$ is less than the first length $L_1$. The apex is defined by a terminating end of each of the first protrusions and the second protrusions. The wing extends along the lengths of each of the first protrusions and the second protrusions from the apex to the base portion. These wings on the same protrusion are separated by a distance and provide additional surface area of the reef inserts in the artificial reef segments for the organisms to attach and grow. The wings contribute to habitat complexity and provide extra barrier for protection from predators and contributes in providing a water barrier, breakwater, and artificial habitation. The wings contribute to coral out planting, as noted above. The concept of habitat complexity refers to the variety in the arrangement of physical structures and features within an environment that contains a diverse range of elements. These elements include shelters, substrates, vegetation, and various physical structures, all of which contribute to creating a three-dimensional and intricate living space. This complexity is essential for providing different niches and resources that support a diverse array of species, fostering rich biodiversity and ecological interactions within the habitat. Such habitat complexity enhances the overall biodiversity and ecological dynamics of a particular habitat. As disclosed herein there are two types of protrusions such as the first protrusions and the second protrusions, it is understood that the design and structure of the insert more have more protrusions of a length other than $L_1$ and $L_2$ to have a denser and complex layout and provide more surface area.

Figure 11D:
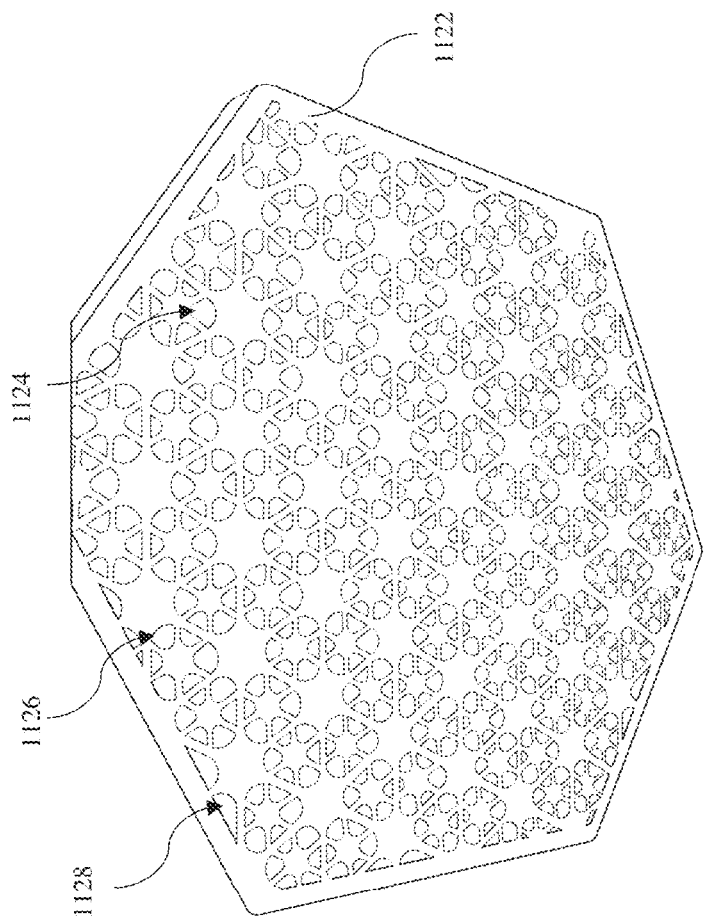
Figure 11E:
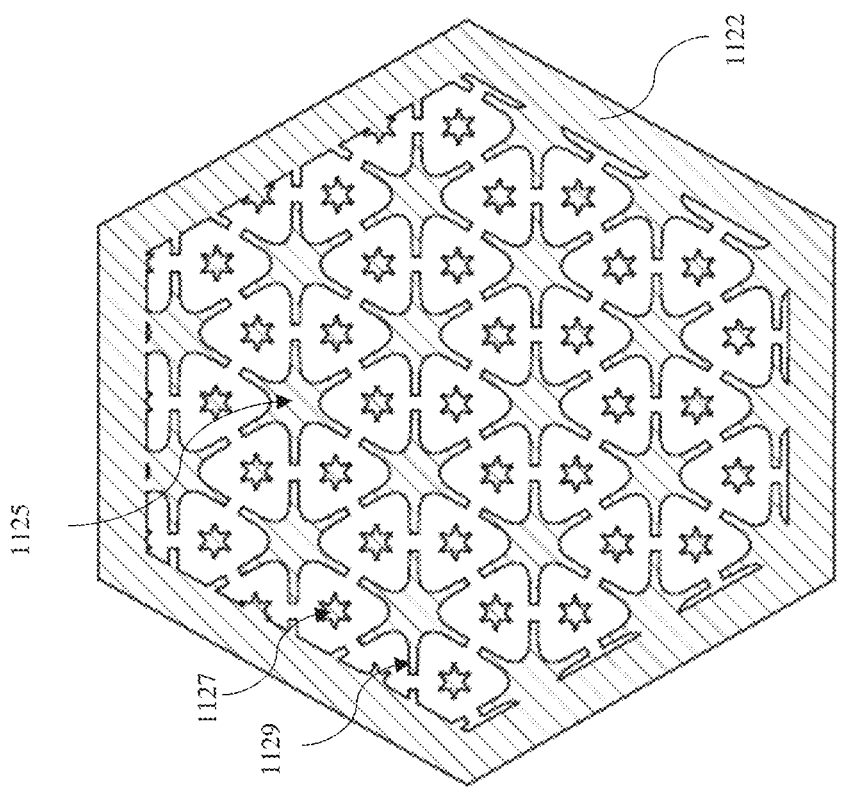

FIG. 11D is the bottom view of the reef insert shown in FIG. 11A. The reef insert has the base 1122 also referred to as the second side and a number of openings distributed across the surface of the reef insert, such as the openings 1124, 1126, and 1128. In another embodiment, the reef insert of FIG. 11A has a different design of the base, as shown in the bottom view of the insert in FIG. 11E. The holes 1125 correspond to the apex of the first protrusions, the holes 1127 correspond to the apex of the second protrusions and the holes 1129 illustrate the wings of the first protrusions from bottom view.

The artificial reef system is designed with versatility in mind, allowing for different configurations of its components to suit varying ecological and structural needs. In one embodiment, the insert is a separate, removable segment that can be precisely positioned within the overall reef structure. This removable design offers flexibility, enabling adjustments or replacements of the insert as required by environmental conditions or specific conservation goals. It allows for easy maintenance and adaptation of the reef structure to evolving marine life needs.

In other embodiments, the reef segment may be manufactured with an insert already embedded within an opening. In this design, the insert and the surrounding reef structure form a uniform, homogenous entity. This can be achieved through a molding process, where both the insert and the reef segment are cast together, resulting in a seamless integration of the two components. This unified structure offers enhanced stability and durability, as there are no separate parts that could potentially shift or detach under marine conditions. The homogenous design also ensures a consistent texture and surface across the entire reef segment, which can be beneficial for certain types of marine life that require uniform habitats. Such a manufacturing approach simplifies the installation process and ensures a cohesive structure that is well-suited for long-term ecological support and marine habitat creation.

Figure 10D:
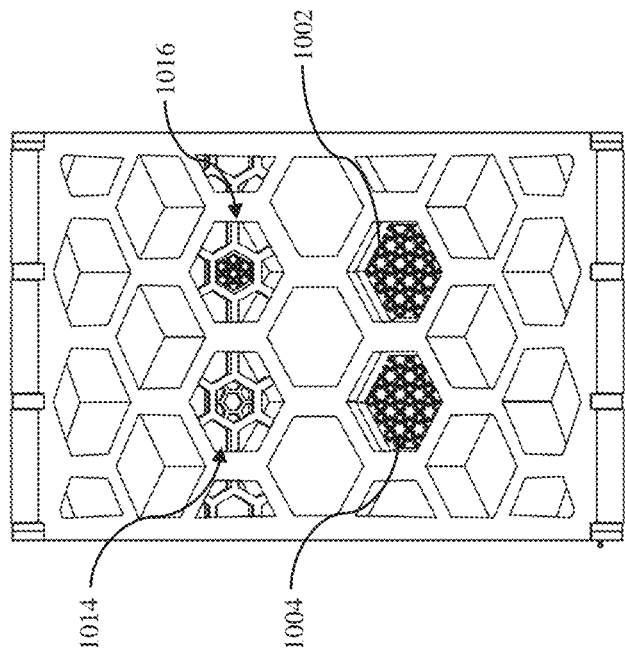
Figure 10C:
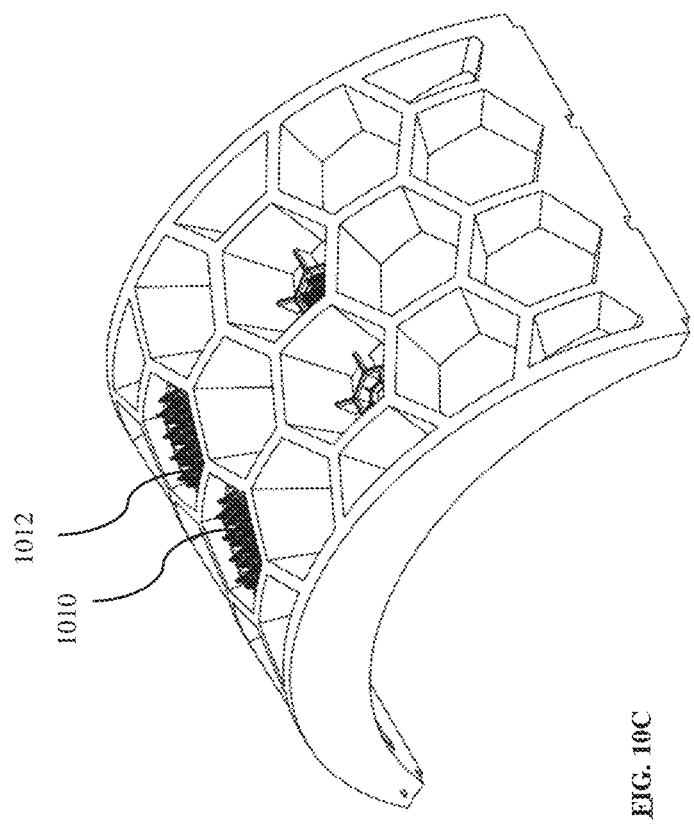
Figures 10E, 10F:
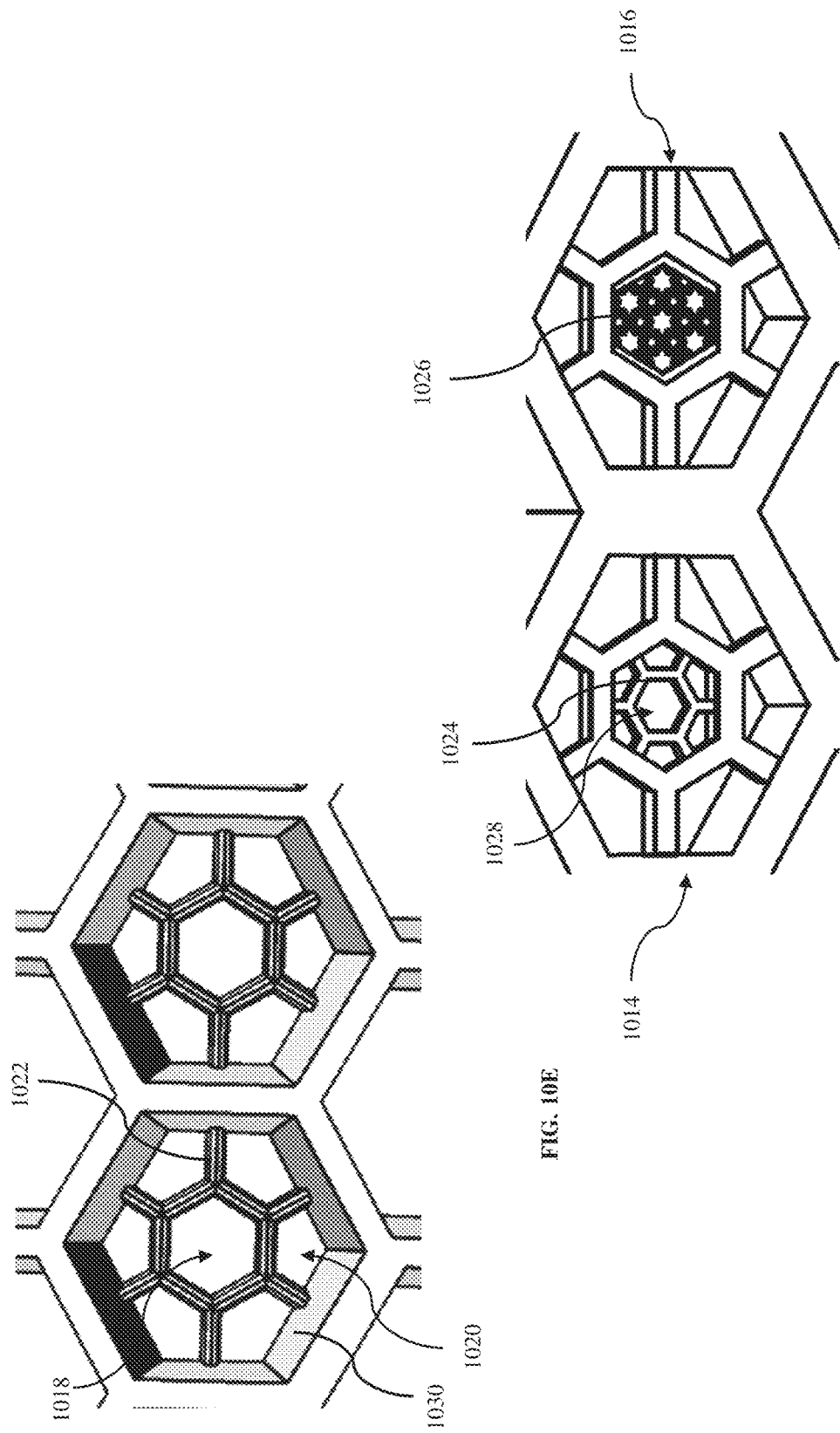

As shown in FIGS. 10C and 10D, the openings 130 can have different types of reef inserts within the openings of an artificial reef segment. For example, the openings may have three-dimensional web-like structure 1014 and 1016 and star pattern reef inserts 1002 and 1004 within the openings of the same artificial reef segment. FIG. 10E illustrates a top view of the reef inserts having three-dimensional web-like structure. A three-dimensional web-like structure refers to an arrangement where multiple interconnected frame segments come together to form a complex network of openings. These openings can vary in size and shape, creating a hierarchical structure of spaces. The interconnected nature of the frame segments means that each segment contributes to the overall stability and shape of the entire structure, much like the strands of a spider's web interlace to form a cohesive whole.

In this context, the term 'three-dimensional' emphasizes that the structure extends in all spatial directions-length, width, and height-rather than being flat or two-dimensional. This quality allows for a more intricate and spatially complex design, offering a greater variety of niches and habitats, particularly useful in applications like artificial reefs or architectural designs where spatial complexity is desirable.

The hierarchical nature of the openings in this structure refers to the varying sizes of the spaces created by the frame segments. This can mean larger openings are supported by broader frame segments, while smaller, more intricate openings are formed by finer interconnections. Such a design allows for a wide range of uses and can cater to different requirements, whether they be for specific species in an ecological context or particular functional needs in architectural or engineering projects.

The three-dimensional web-like structure is configured for providing a complex spatial arrangement for enhancing habitat complexity and water flow. The complex spatial arrangement enhances overall biodiversity and ecological dynamics of a particular habitat. In an embodiment, the three-dimensional web-like structure comprises a base structure having a first side and a second side, plurality of secondary openings being of a smaller size than the plurality of openings of the artificial reef segment. The secondary openings are configured for providing water flow from a first side of the base structure to a second side of the base structure. As shown, the openings 1018, and 1020 represent the secondary openings that are smaller than the size of the opening 130 of the artificial reef segment. The structure has arms 1022, also referred to as a frame segment, that are in contact with the inner wall 1024 of the opening.

In another embodiment, as shown in FIG. 10F, the reef inserts may define a pattern within the structure, such as the three-dimensional web-like structure 1016 defined inside the secondary opening 1018 of the three-dimensional web-like structure 1014, and a star pattern of the reef insert 1026 define within the secondary opening 1018 of the three-dimensional web-like structure 1016. Such a structure defines a plurality of tertiary openings, such as the opening 1028 of the three-dimensional web-like structure 1016 or the openings in the star pattern of the reef insert 1026, within the secondary opening 1018 of the plurality of openings thereby creating a hierarchical openings within the artificial reef insert and is also referred to as hierarchical webbings. In an example, the secondary openings are smaller than the plurality of openings and larger than the tertiary openings. The hierarchical openings are uniform and have secondary openings and tertiary openings provide additional support and reinforcement to the secondary openings of reef inserts. This helps to maintain the structural integrity of the reef and prevents collapse or shifting of materials over time. The structure increases the complexity of the habitat. This allows for a greater variety of microhabitats and niches, attracting a wider range of marine organisms. Such reef structures provides a substrate for the attachment of marine organisms such as corals, sponges, and algae. This promotes the colonization of the reef by a diverse array of species, leading to increased biodiversity and ecological productivity and creates sheltered areas within the reef, providing protection for juvenile fish and other small marine organisms. This helps to support the growth and survival of young organisms, contributing to the overall health of the ecosystem.

Figure 12A:
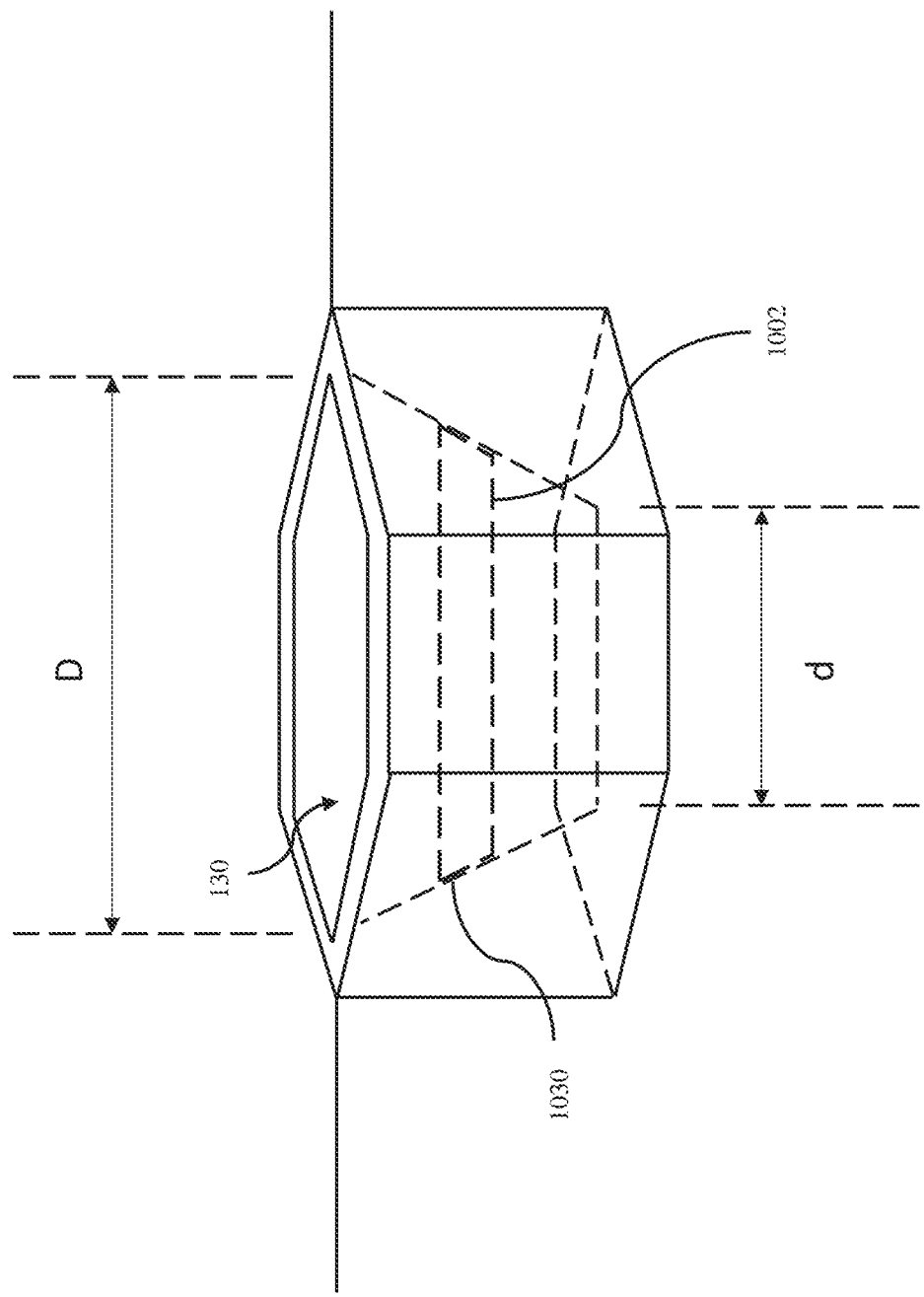
FIGS. 12A, 12B, 12C, 12D, 12E and 12F are schematic sectional views of an opening of the artificial reef segment, according to an example embodiment.
Figure 12B:
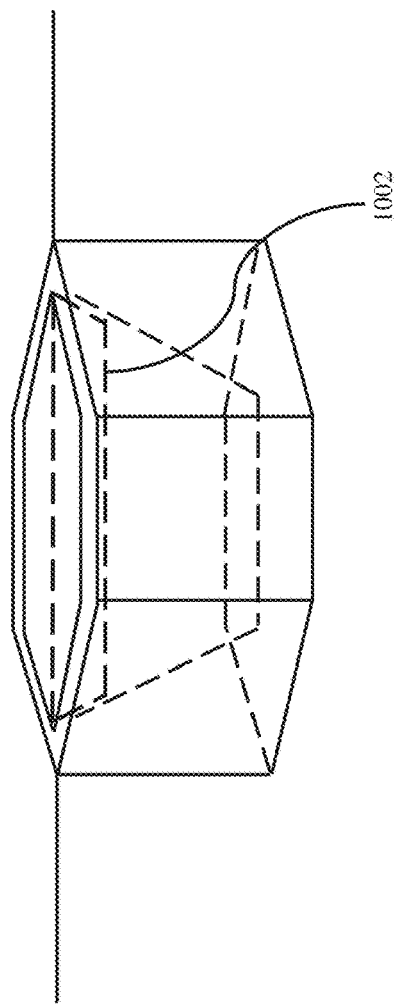

FIGS. 12A, 12B are schematic sectional views of the openings 130 of the artificial reef segment. In an example, the opening 130 has a tapered structure having inner wall 1030 of the opening gradually narrow or converge toward the back of the opening defines a channel. The openings are to receive and attach reef inserts, such as the reef insert 1002 within the channel. In one embodiment, the reef inserts may be press-fitted into the channel to snugly fit into the reef segments. The reef inserts may have friction fit inserts and the reef inserts are designed to fit tightly into the openings through friction, creating a secure and stable attachment without additional fasteners. In other embodiment, the reef inserts have features that interlock with corresponding structures inside the opening, providing a strong and stable connection, such as a puzzle-piece-like structures on the inserts that fit into complementary cutouts within the opening. In another example, the reef inserts may have be coupled to the walls of the openings based on a stop mechanism, such as threaded components that can be screwed or twisted into matching threads within the opening or any other mechanical fasteners such as bolts, nuts or pins. In another embodiment, the reef inserts have components designed to snap securely into place within the opening or have magnetic attachment, providing a quick and reliable attachment. The reef inserts may have snap-fit tabs or hooks on the inserts that latch onto corresponding features inside the opening. In certain examples, the reef inserts may be inserted using pressure fit, or sliding track or rail mechanism. As noted above, the reef inserts are secured within the opening using marine-friendly adhesives, bonding the insert to the reef structure. This may include epoxy, marine sealants, or other adhesive materials applied to the contact surfaces of the reef insert and the opening.

As shown, the separation between opposite walls or the diameter at the back or lowest point is d and the distance between the opposite walls near the front side of the opening is D. The diameter D is proximate to where the opening meets the outer curved surface of the artificial reef segment and is referred to as the first diameter. The first diameter D is proximate to where the opening meets the inner curved surface of the artificial reef segment and is referred to as the second diameter herein. In an example, due to the tapered design, the distance between the opposite walls at the front of the opening gradually reduces towards the back of the opening. The first diameter D is greater than the second diameter d of the opening.

The artificial reef segment, featuring hexagonal-shaped openings, leverages this geometric configuration to enhance its structural integrity. The hexagonal shape is known for its efficiency in distributing stress and strain across the structure, a principle widely observed in nature and engineering. In the context of the artificial reef, these hexagonal openings contribute to a more uniform distribution of mechanical forces exerted by water currents and waves. This uniform stress distribution is crucial for maintaining the segment's stability and durability under various marine conditions.

When these hexagonal openings are tapered, with a design that narrows from the outermost surface to the inner surface, this feature further reinforces the structural aspect of the reef segment. The tapering creates a channel-like effect, which not only contributes to the overall strength of the structure but also enhances its ability to withstand the dynamic marine environment. The tapered design aids in reducing the direct impact of forces, such as strong underwater currents and wave action, by channeling and dissipating these forces more effectively throughout the structure.

Additionally, the hexagonal arrangement and the tapered channels play a significant role in breaking up wave energy. When waves encounter the artificial reef segment, the hexagonal and tapered structure disrupts the wave's energy, causing it to be diffused and dissipated over a larger area. This is particularly important for the protection of marine life and the conservation of reefs and living shorelines. By reducing the power and impact of waves, the artificial reef provides a calmer and more stable environment for marine organisms, including corals and fish. This stability is essential for their growth and survival, as excessive wave force can cause physical damage to delicate marine species and disrupt their natural habitats.

Furthermore, the reduction in wave energy contributes to the preservation of existing natural reefs and living shorelines. By acting as a buffer, the artificial reef segment mitigates coastal erosion and protects the shoreline from the damaging effects of strong waves and storm surges. This is vital for maintaining the integrity of coastal ecosystems and for the long-term sustainability of the shorelines that are crucial for both ecological balance and human activities.

Additionally, the tapered channel design within the artificial reef segment plays a crucial role in the efficient fitting and retention of multiple inserts. The channels, which narrow from the outermost surface towards the inner surface, create a conical shape that is ideally suited for holding the inserts snugly in place. This tapering ensures that as an insert is positioned within the channel, it fits more tightly and securely the further it is inserted, providing a stable and secure fit. The incorporation of multiple inserts stacked within a tapered channel presents a unique structural feature. This configuration allows for the sequential placement of inserts, each conforming to the tapering geometry of the channel, thereby ensuring a secure and precise fit. The layered arrangement of these inserts within the channel is critical for several reasons.

Firstly, this stacking technique provides enhanced habitat complexity within the reef segment. Different layers can be tailored with varying characteristics, such as surface texture or material composition, to suit diverse marine species and ecological needs. This multifaceted approach to habitat creation offers a significant improvement in fostering biodiversity compared to more uniform, single-layer designs.

Additionally, the capacity to stack multiple inserts in a tapered channel allows for greater customization and adaptability of the reef segment. Depending on the specific environmental requirements or conservation objectives, inserts can be selectively added, removed, or replaced, affording a high degree of flexibility in the configuration of the reef structure.

Furthermore, from a structural standpoint, the snug fitting of inserts within the tapered channel contributes to the overall stability and durability of the reef segment. The tapered design ensures that each successive insert is firmly secured, enhancing the segment's ability to withstand marine environmental forces such as currents and wave action.

The design of these tapered channels simplifies the process of installing the inserts. The wider opening at the outermost surface allows for easy initial placement of the inserts, while the narrowing channel naturally guides and positions the insert as it is pushed inward. This feature is particularly beneficial in ensuring that the inserts are correctly and securely positioned within the reef structure, minimizing the risk of misalignment or displacement under marine conditions.

Furthermore, the snug fit provided by the tapered channels is essential for the long-term stability of the inserts within the artificial reef segment. Once in place, the inserts are less likely to move or dislodge, even in the presence of strong currents or wave action. This stability is vital for the overall effectiveness of the reef system, ensuring that the inserts remain in their intended positions to provide continuous ecological benefits, such as supporting coral growth and offering protection to marine life.

The reef insert may be positioned at different heights within the opening based on the diameter of the reef inserts. The diameter of the reef inserts are also referred to as a third diameter. In certain embodiments, the third diameter is sized to fit within a channel defined by a tapered portion of the first opening such that the artificial reef insert is retained within the channel. For example the reef insert may be positioned in the middle of the opening as depicted in FIG. 12A. In another embodiment, as shown in FIG. 12B, the reef insert may be positioned towards the top of the opening closer to the front end of the opening to create a flush surface. The reef insert in such a configuration aligns seamlessly with the surrounding structure, resulting in a smooth and level surface. The flush surface encourages a smoother flow of water over the reef structure and minimizes drag and water turbulence over the reef structure. This reduces stress on the artificial reef in dynamic marine environments, promoting stability and longevity. The smooth and flush surface provides an ideal substrate for encrusting organisms, such as corals, sponges, and algae. These organisms can attach and grow across the surface, contributing to the development of a diverse and thriving ecosystem.

Figure 12C:
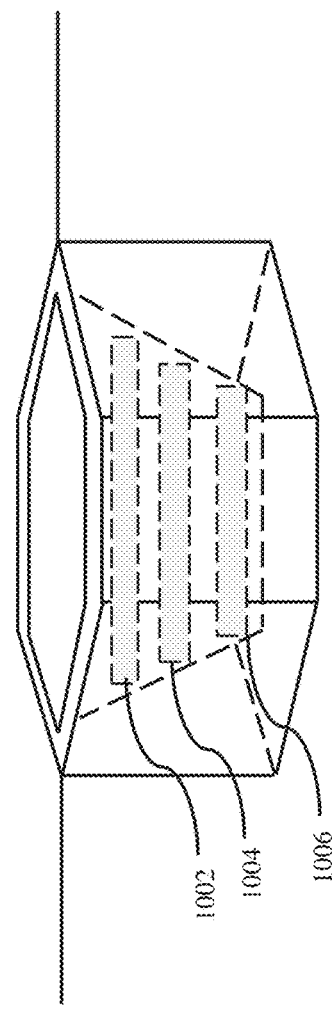
Figure 12D:
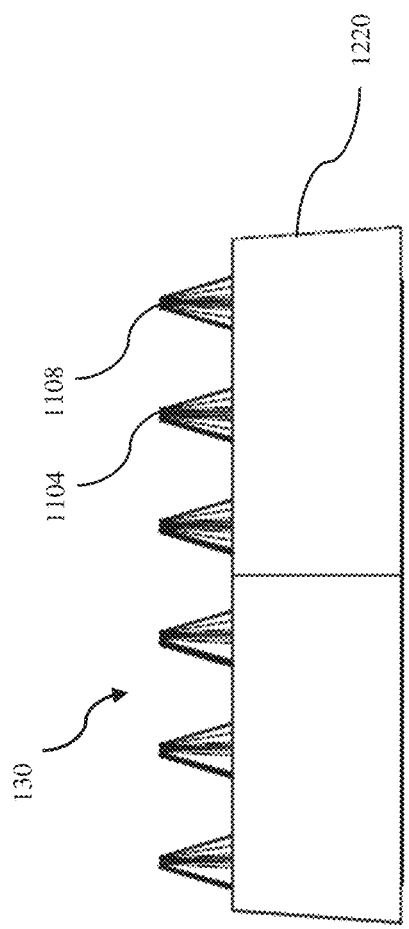
Figure 12E:
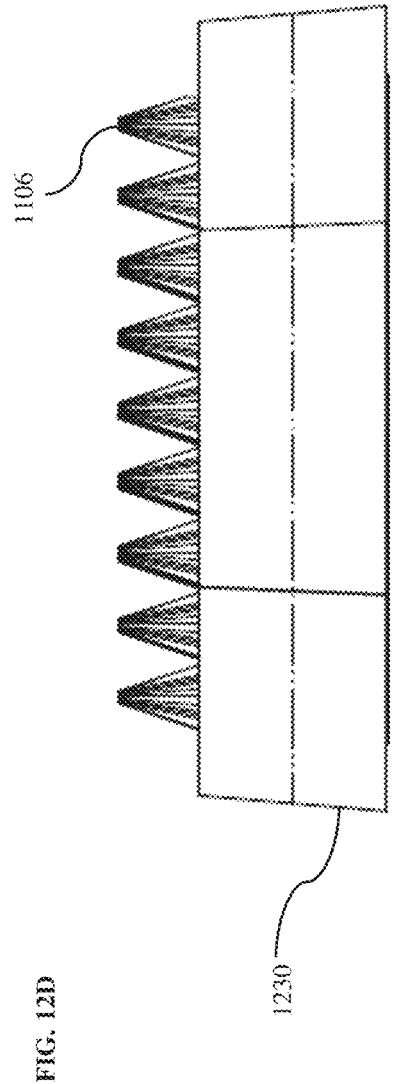

In another embodiment, FIGS. 12D and 12E illustrate the side views of the artificial reef segment having the reef insert, such as the insert with pyramidal protrusions, when the reef insert is placed towards the top of the opening 130. As shown, the protrusions 1104, 1108 extend out from the opening 130 in FIG. 12D from a portion 1220 of the artificial reef segment in a side sectional view. FIG. 12E shows the protrusions, for instance protrusion 1106 extending out of the opening 130 from the portion 1230 of the artificial reef segment. Such protrusions extending out the opening can mimic natural features, such as rocks or coral branches, creating a more complex and habitat-rich environment within the artificial reef. This complexity attracts a greater diversity of marine life, including fish, invertebrates, and algae. The protrusions create additional shelter spaces for fish and other marine organisms. These features may serve as ideal locations for fish to seek refuge from predators or as spawning sites, contributing to the reproductive success of certain marine species.

In another embodiment, two or three reef inserts may be disposed within the same opening at a distance from each other. FIG. 12C shows three reef inserts 1002, 1006 and 1008 positioned within the same opening for increased surface area and density of structure provided for marine organisms to attach and grow. The two or three inserts can be of the same type or can be of different types depending on the surface area and the density of structure required. For example, the top two reef inserts can be three-dimensional web like structures and the third reef insert may be pyramidal protrusion. The two or three inserts in one opening allows for efficient use of space within the artificial reef segment and enhance the resilience of the artificial reef to disturbances. If one insert is damaged or dislodged, the other two inserts may continue to provide habitat and support the ecosystem. In another example, the reef inserts may have structure having a base with no openings and are used as fillers. When disposed within the opening 130, the reef inserts close the opening 130 of the artificial reef segment.

Figure 12F:
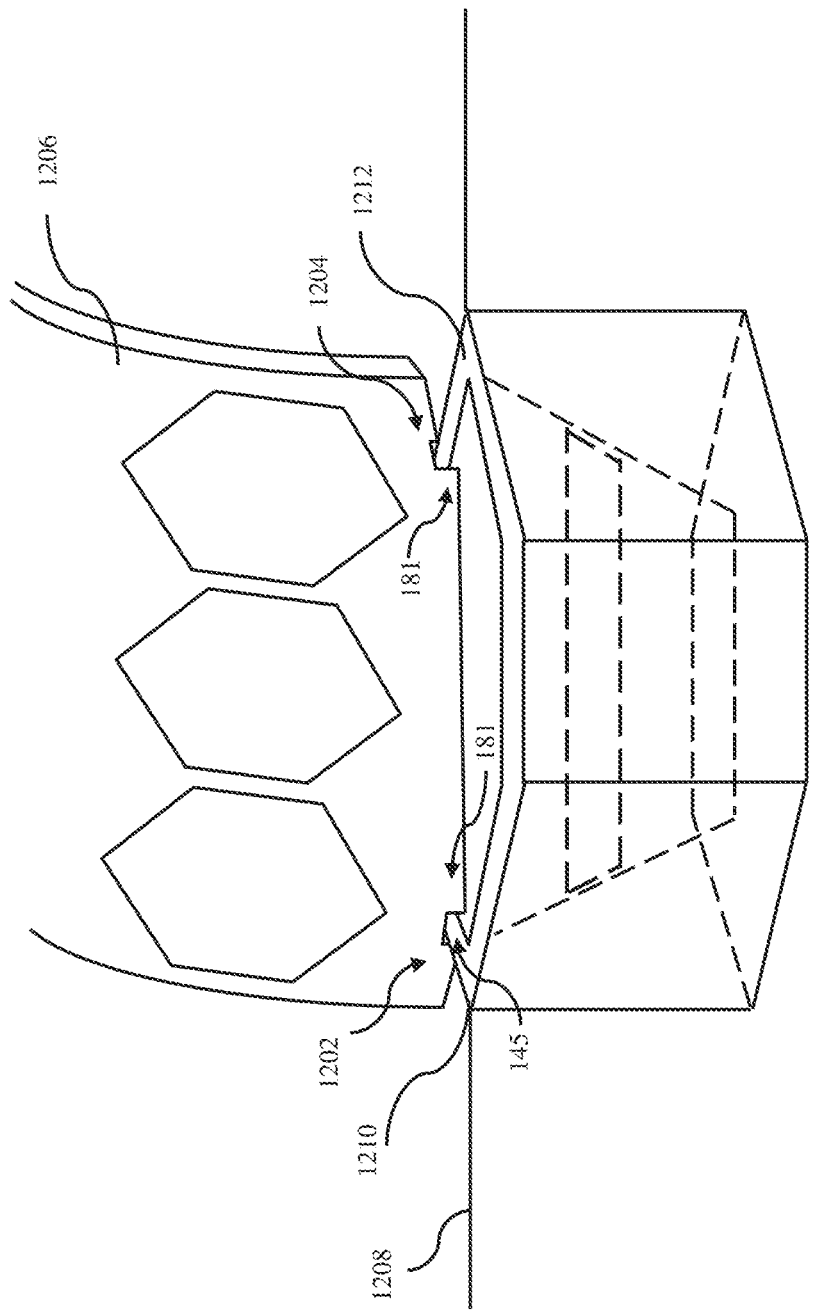

FIG. 12F shows the interlocking portions 1202 and 1204 where one reef segment 1206 is affixed with another reef segment 1208. For ease of explanation, a hexagonal structure 1210 of the reef segment 1208 is illustrated. As noted above, the frame segment 1206 is sized to interlock with the openings of the artificial reef segment 1208, with reference to FIGS. 5 and 6. Each frame segment includes a height 182 and a length 180. The outer portions 181 (illustrated in FIGS. 5, 6 and 12F) of the frame segments are configured to fit snugly with the openings by use of force, also known as press fitting or interference fitting. The artificial reef segments includes a plurality of cutouts 145 disposed along the terminating end 150 of each artificial reef segment. The cutouts are designed and sized to fit the portion 1212 between each hexagonal opening such that the cutout may be inserted onto the portion 1212 forming a snug fit. In some embodiments, the cutouts may be angled differently applying different pressures to the openings when in contact. The precise fit of the cutouts ensures a snug connection, reducing the risk of movement caused by water currents or external forces. Such interlocking allows stacking of reef segments on top of each other and attaching in a side by side manner. The connected segments distribute loads and stresses more uniformly, making the artificial reef less susceptible to breakage or failure. The interlocking design simplifies the installation process. Aligning and connecting the reef segments becomes more straightforward compared to other connection methods.

Figure 13A:
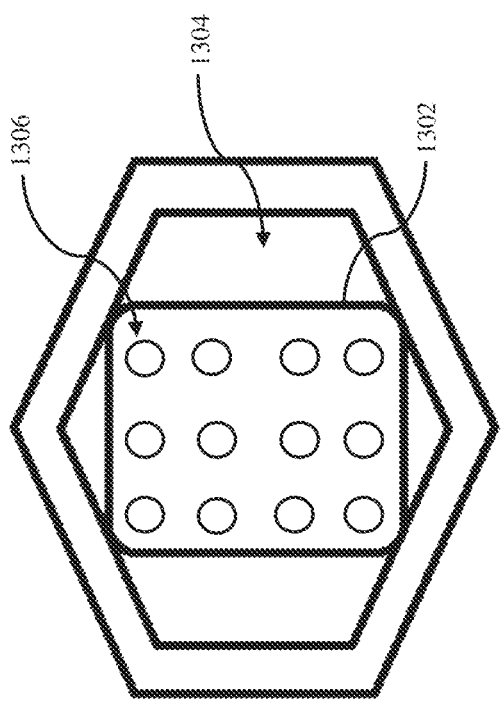
FIGS. 13A and 13B are top schematic views of reef inserts positioned inside an opening of an artificial reef segment, according to an example embodiment.
Figure 13B:
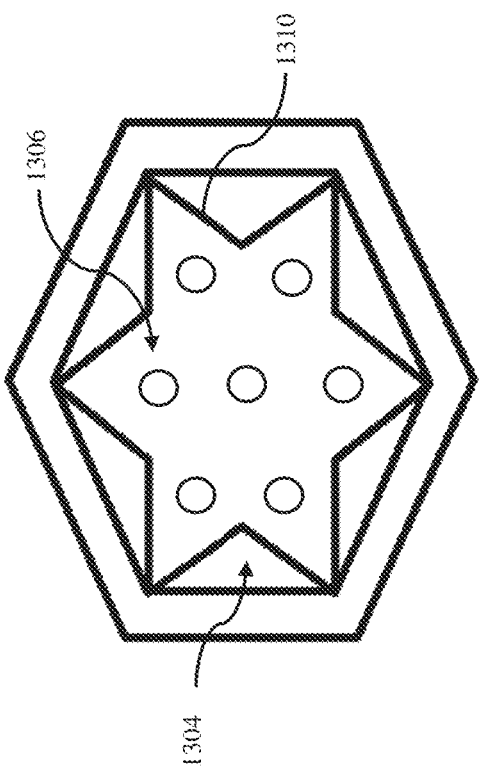

As noted above, the reef inserts may have same shape as the openings of the artificial reef segment. For instance, the artificial reef insert comprises an insert perimeter designed to correspond with the opening perimeter of the opening such that the shape and structure of the perimeter of the reef insert matches with the perimeter of the opening. The reef inserts engage with the plurality of openings of the artificial reef segment, where the artificial reef insert of the plurality of artificial reef inserts is disposed within a first opening of the plurality of openings. The artificial reef insert comprises an insert perimeter designed to correspond with an opening perimeter of the first opening at the outer curved surface of the artificial reef segment such that the at least one artificial reef insert is securely fit within the first opening. As noted above, the reef inserts have a third diameter sized to fit within a channel defined by a tapered portion of the first opening such that the artificial reef insert is retained within the channel. For example, the reef inserts 1002, 1004, 1006 and 1008 have a hexagonal shape to be disposed within the hexagonal opening of the reef segment. In this configuration, each outer side of the reef insert abuts an inner wall of the opening, such that each inner wall of the opening is in contact with a portion of the reef insert. In other embodiments, the reef inserts may have a different shape and the outer sides of the reef insert may contact fewer inner walls of the openings. For example, in FIG. 13A, the reef insert 1302 has a rectangular shape and abuts four inner walls of the hexagonal opening instead of six inner walls. FIG. 13B shows a star shaped reef insert 1310 that abuts the vertex points (corners) of the inner walls of the opening. The gaps 1304 may allow passage of water and reduce water or current pressure on the reef inserts to maintain a uniform flow of water. The reef inserts also has holes 1306 uniformly distributed across the surface of the reef inserts.

Figure 14A:
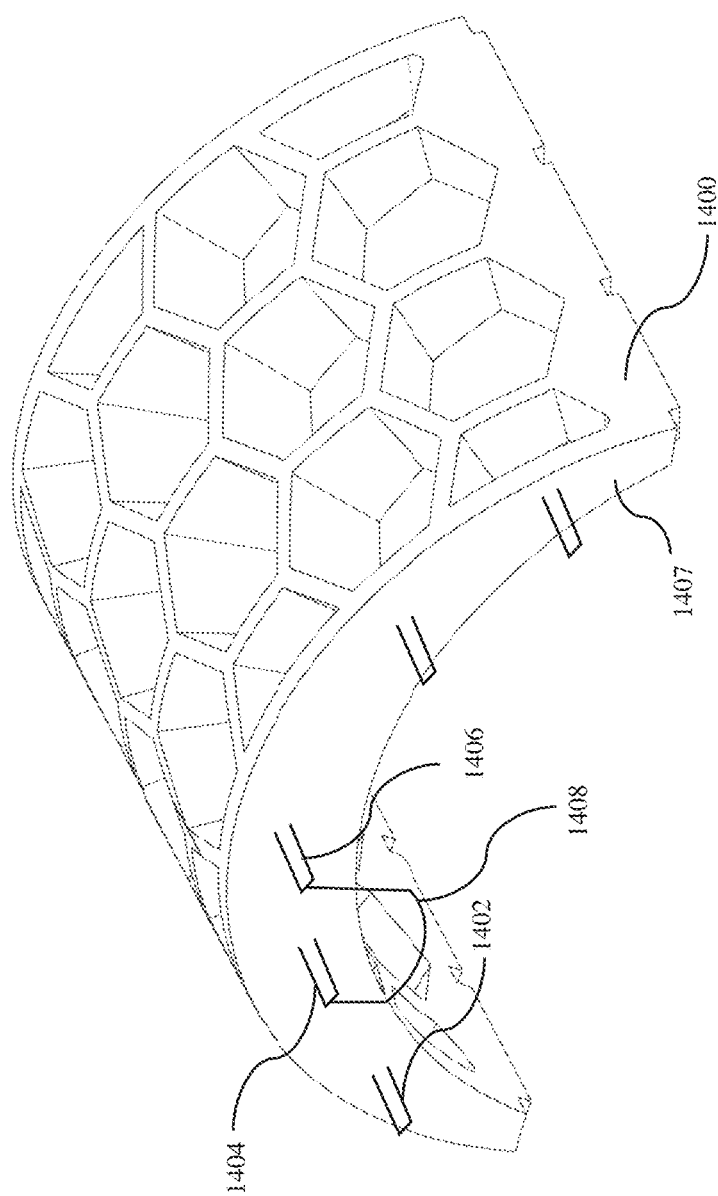
FIGS. 14A, 14B and 14D are schematic views of artificial reef segments, according to an example embodiment.

FIG. 14A illustrates a side view of the artificial reef segment 1400 having steel attachments, such as rods protruding out from side surface of the artificial reef segments. As shown, the rods 1402, 1404, 1406, partly extend from the side face 1407 of the reef segment. As illustrated, there are five rods extending from the side face, it is understood that there may be number of rods greater than five or fewer than five covered within the scope of the invention. In an embodiment, these rods may extend across the width of the artificial reef segment and partly protrude from the other side face opposite to the side face 1407 of the artificial reef segment. The structure and shape of the rods may be rectangular or tubular, and may be angled downwards to provide an improved coupling with other artificial reef segments. In an example, the rods are made of material, such as stainless steel that is an alloy composed of iron, chromium, nickel, and other elements, and is corrosion-resistant due which protects it from rusting. Stainless steel is durable, strong, and resistant to both corrosion and staining. Other materials used for the rods may be galvanized steel coating with a layer of zinc. The rods may also be coated using epoxy coatings or polymer coatings on the steel. The material selected for the rods are rust-resistant for longevity and structural integrity of the artificial reef segments. Rusting compromises the aesthetic appeal of the reef and also leads to the formation of cracks, which affects the overall stability of the structure. The rods that partly protrude out from the side face provide an attachment point for lifting and transporting the reef segments during and after installation of the artificial reef segments. The steel structures aid in securing the reef segments to other reef segments for a particular configuration of a reef structure using the metal wires.

Figure 14B:
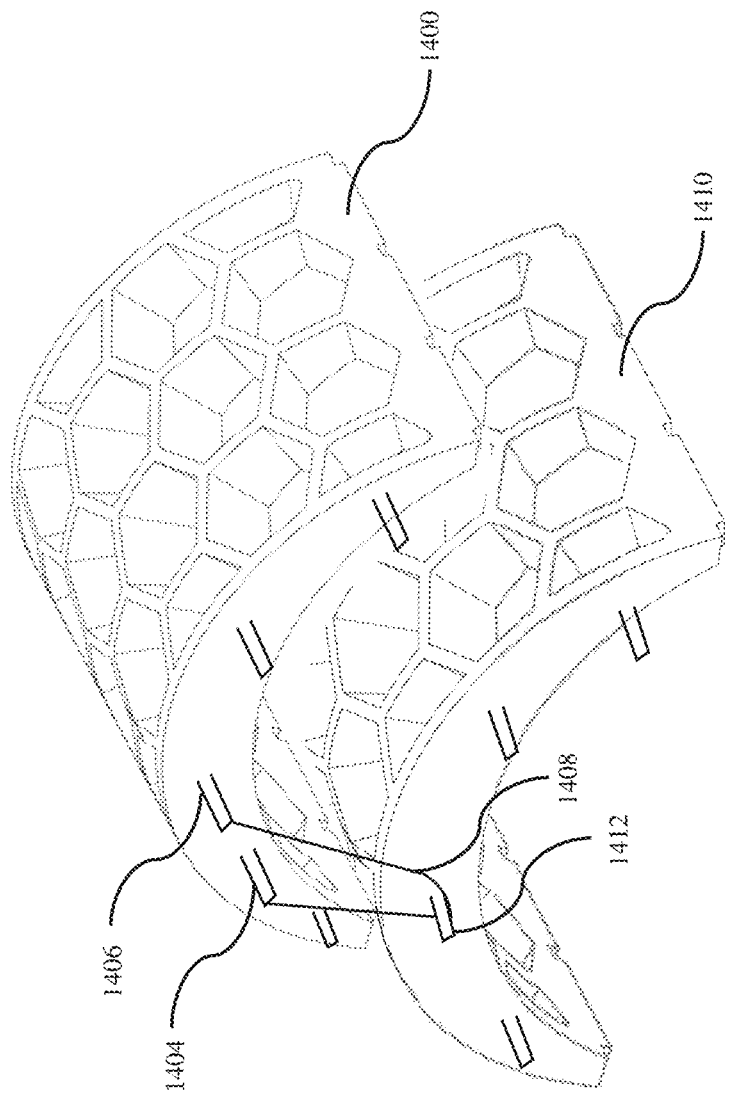
Figure 14C:
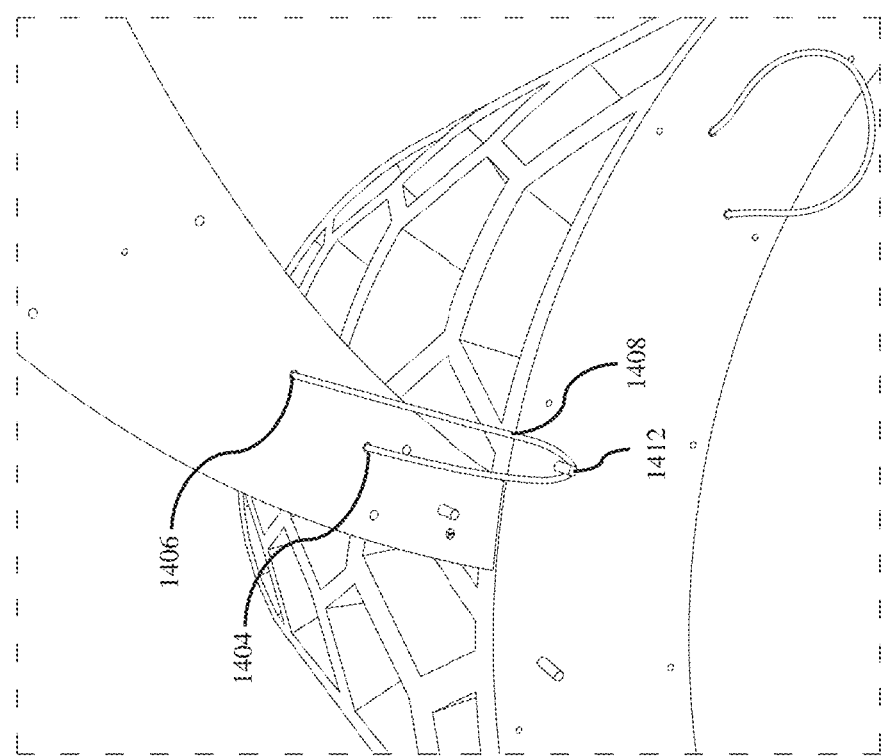
FIGS. 14C, 14E, 14F, and 14G are images of a configuration of artificial reef segments, according to an example embodiment.
Figure 14D:
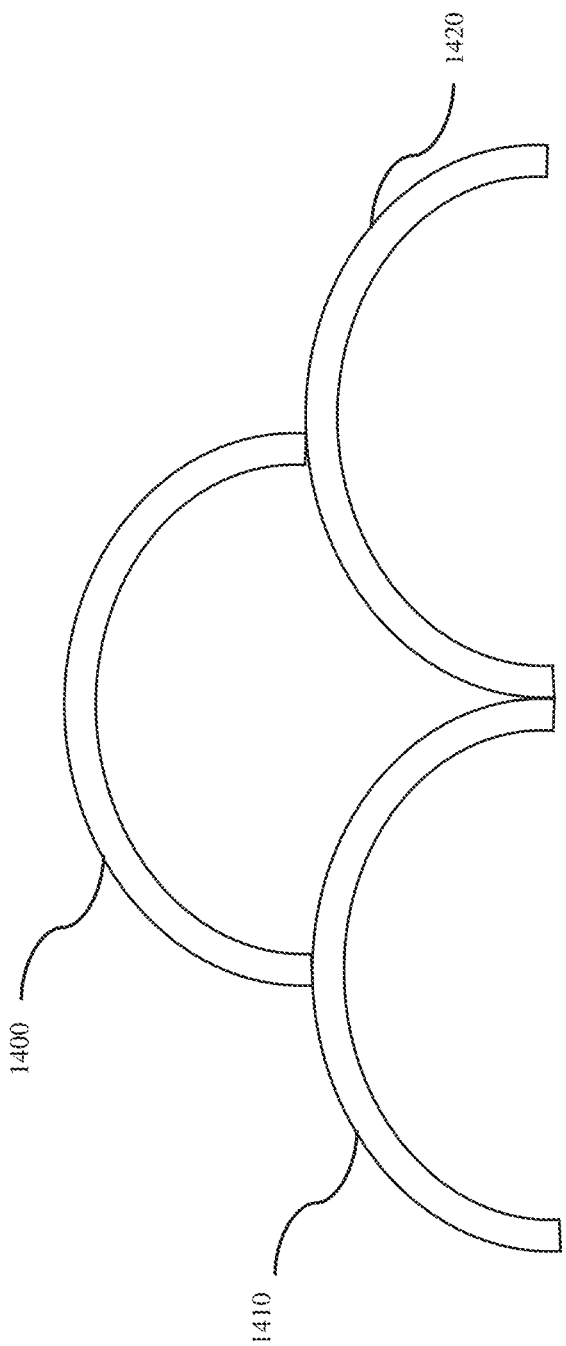

The reef segment 1400 also has a metal wire 1408 coupled to the rods 1404 and 1406. The metal wire 1408 is used for attaching with rods of another reef segment, such as 1420 placed beneath the reef segment 1400, as shown in FIG. 14B and FIG. 14C. In such configuration, metal wires are employed as connectors to physically link the two reef segments. The wires are typically wrapped around the rods or protrusions extending from each reef segment, creating a secure connection. The metal wires may also be used for connecting two reef segments positioned adjacent or side-by-side to each other. As shown in FIGS. 14B and 14C, the metal wire 1408 is wrapped around the rod 1412 of the reef segment 1410.

Figure 14E:
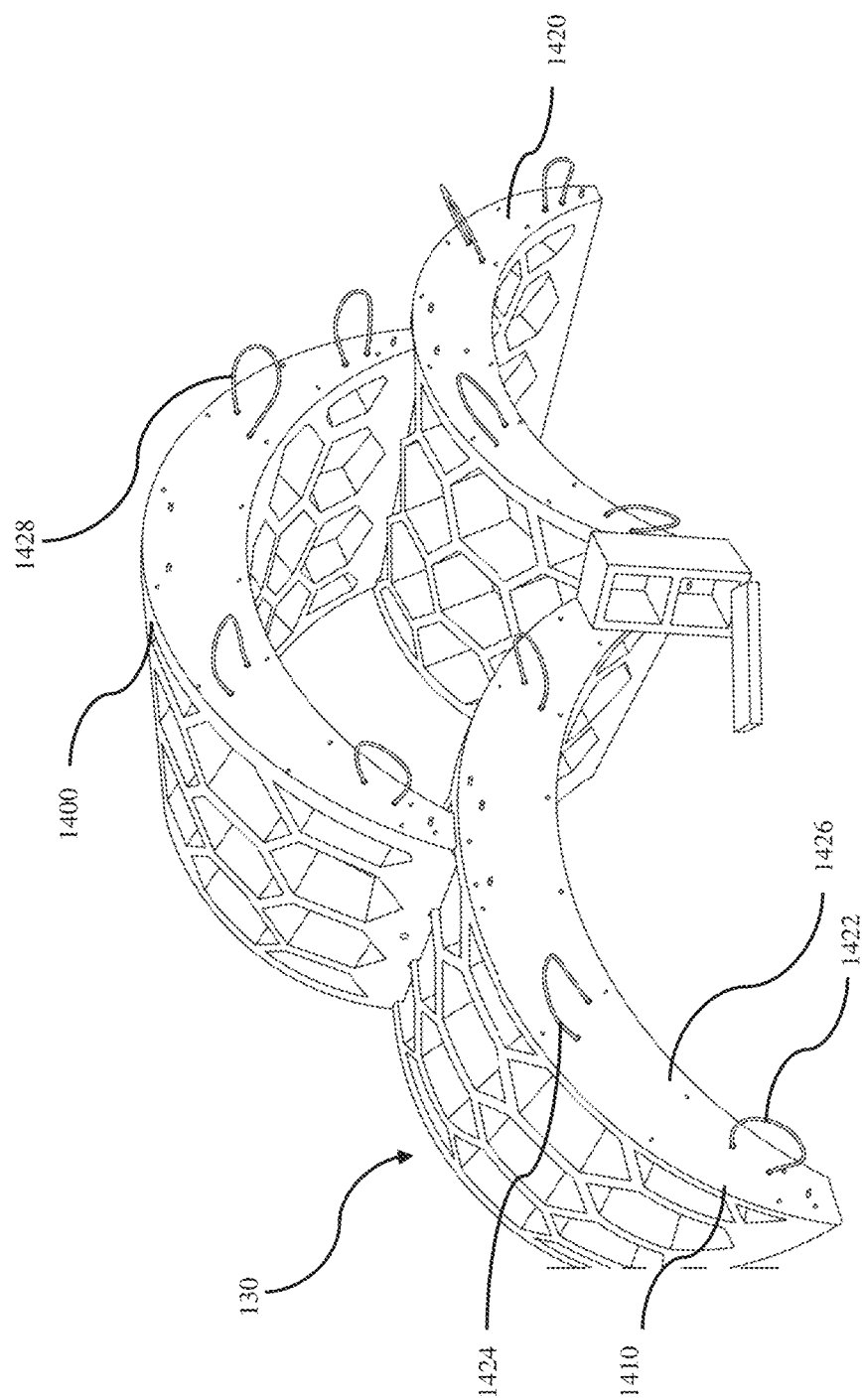
Figure 14F:
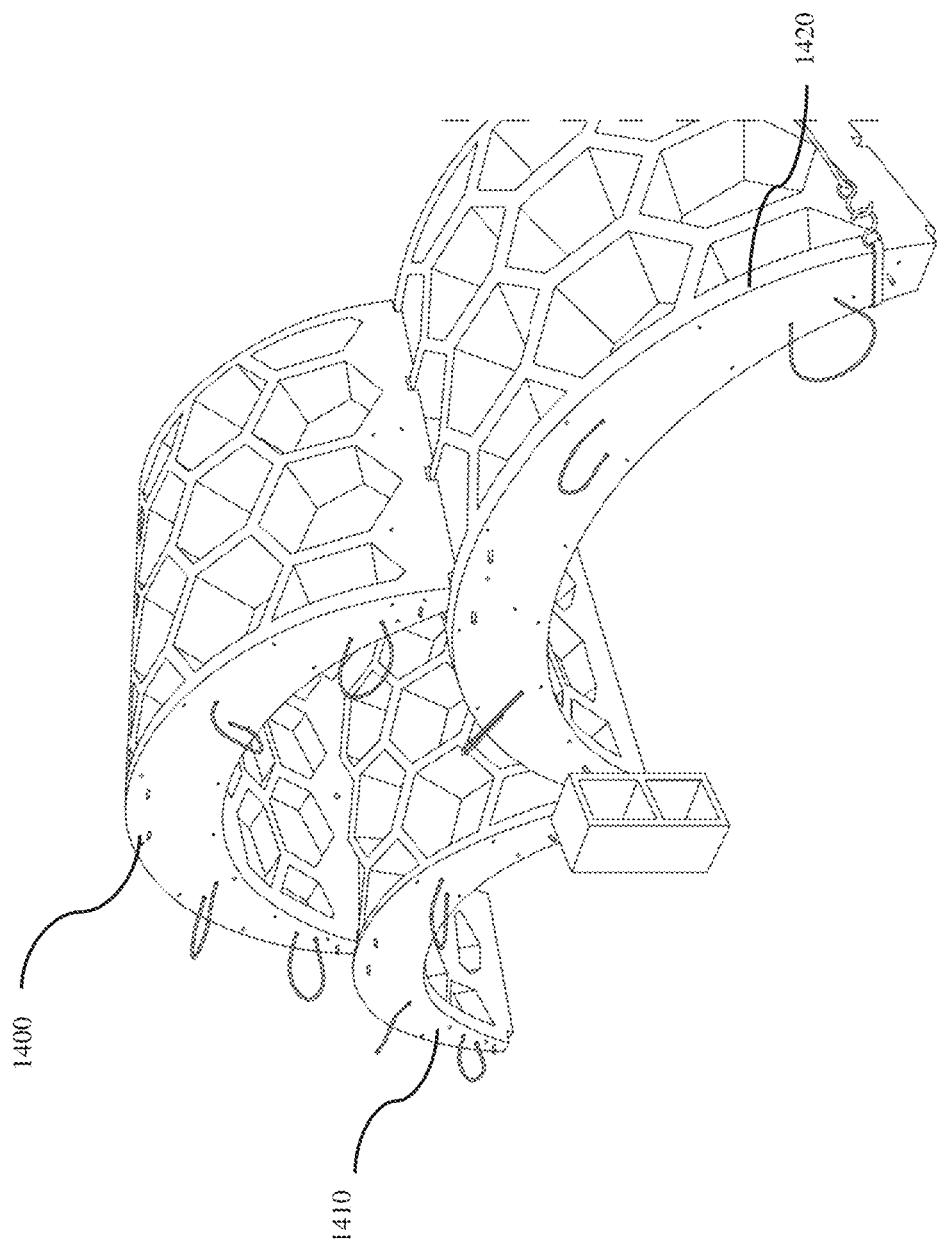
Figure 14G:
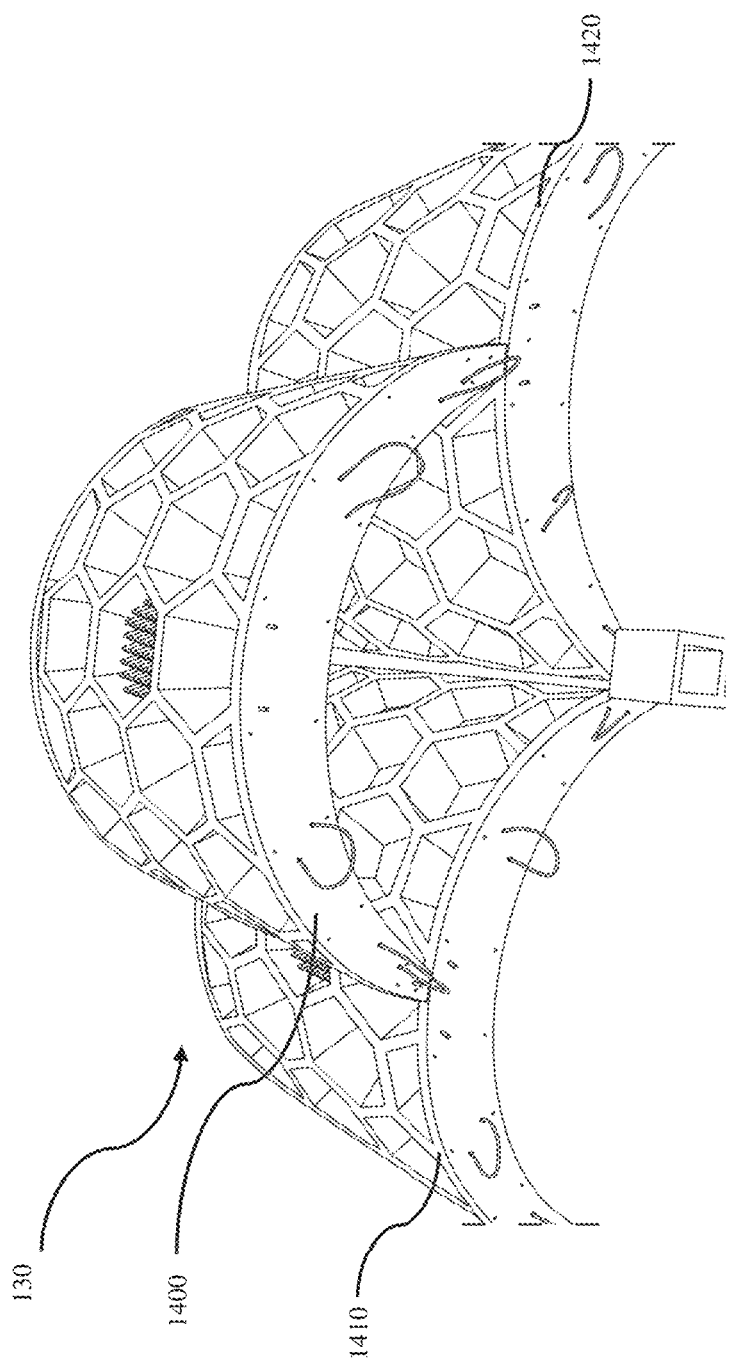

FIGS. 14D, 14E, 14F and 14G illustrate a configuration having one artificial reef segment 1400 placed on top of two adjacent reef segments 1410 and 1420 in a pyramid structure. In such configuration, the three artificial reef segments may be coupled with the metal wires with each other. FIG. 14E shows the artificial reef segment 1410 having metal wires 1422 and 1424 extending out from the side face 1426 and the artificial reef segment 1400 having the metal wire 1428 that extends out of the side face of the artificial reef segment. As shown, there may be multiple metal wires on the side face extending out from the side face of the reef segments. The metal wires have a loop structure that facilitates coupling with rods of other reef segments. There may be other configurations of combining the three reef segments covered within the scope of the invention. Further, the configuration of three artificial reef segments may be positioned close to each other in a zig-zag pattern as shown in FIGS. 4, 8 and 9 to create the reef structure.

In an embodiment, the artificial reef segments have large openings to accommodate and support root growths of mangrove trees or other coastal trees. Openings in the reef structures may be sized and spaced to allow mangrove tree seedlings or mangrove roots to grow through. The hexagonal pattern can accommodate the natural growth patterns of mangrove roots, providing a supportive structure.

Further, in the application of the artificial reef segment as a part of a living reef, particularly in coastal environments, the openings plays a crucial role in supporting the growth and development of tree roots, such as those of mangroves. These roots, known for their ability to stabilize shorelines and provide habitats for various marine species, find an advantageous environment in and around the reef segment's structure.

The openings in the reef segment allow mangrove roots to grow through and around them, effectively intertwining with the structure. This interaction between the biological and artificial components serves multiple ecological and structural functions. Firstly, as the mangrove roots grow and extend through the openings, they become entangled with the reef segment, creating a natural binding effect. This entanglement not only stabilizes the mangroves themselves, anchoring them firmly in place, but also reinforces the structural integrity of the reef segment. Over time, as the roots thicken and expand, they form a robust network that further secures the reef segment against shifting or erosion.

Moreover, the integration of mangrove roots within the reef segment contributes to the reinforcement of the shoreline. Mangroves are renowned for their shoreline stabilization properties, as their complex root systems reduce wave energy and prevent soil erosion. By providing a substrate for these roots to latch onto and grow, the artificial reef segment enhances these natural shoreline protection capabilities. The roots, in conjunction with the reef structure, form a barrier that absorbs and dissipates wave energy, protecting the shore from erosion and storm surges. The openings may also be used for soil collection and for stabilizing soil for accretion and retention of coastal water soil. The hexagonal openings in the artificial reef structures can be designed to create pockets or chambers that allow sediments to settle. The spaces in between the inner walls of the openings accumulate fine particles for soil collection. The disclosed artificial reef segments integrate with mangroves for reducing soil erosion and contributes to broader coastal protection. The disclosed artificial reef segments have geometric and hydrodynamic properties for mitigating coastal erosion.

In addition to structural benefits, the mingling of mangrove roots with the artificial reef segment creates a unique and biodiverse habitat. The spaces within and around the roots become home to various marine organisms, including fish, crustaceans, and mollusks. This habitat complexity, resulting from the combination of artificial and natural structures, supports a rich array of marine life, contributing to the overall ecological health of the coastal area.

Figure 15A:
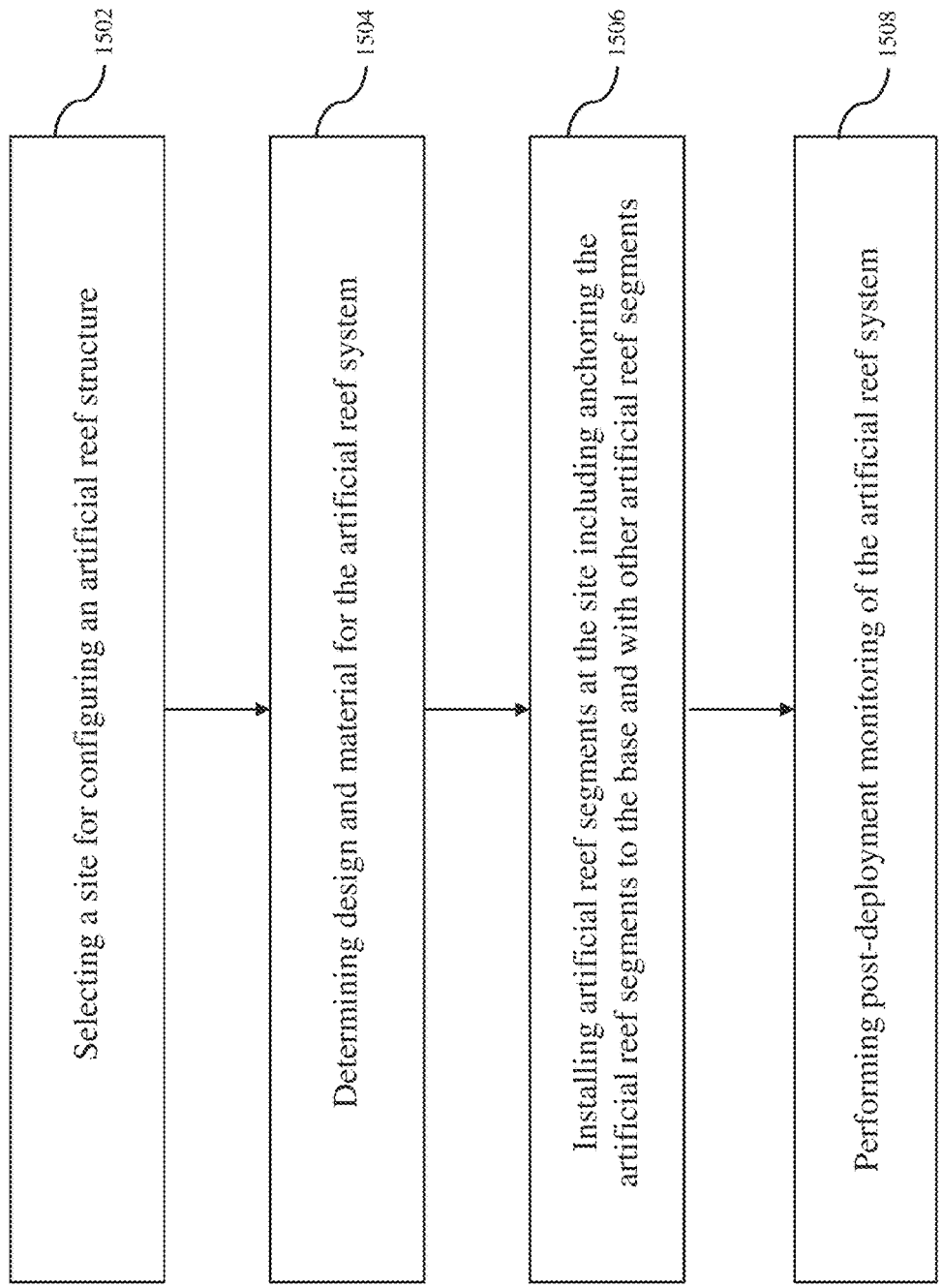
Figure 15C:
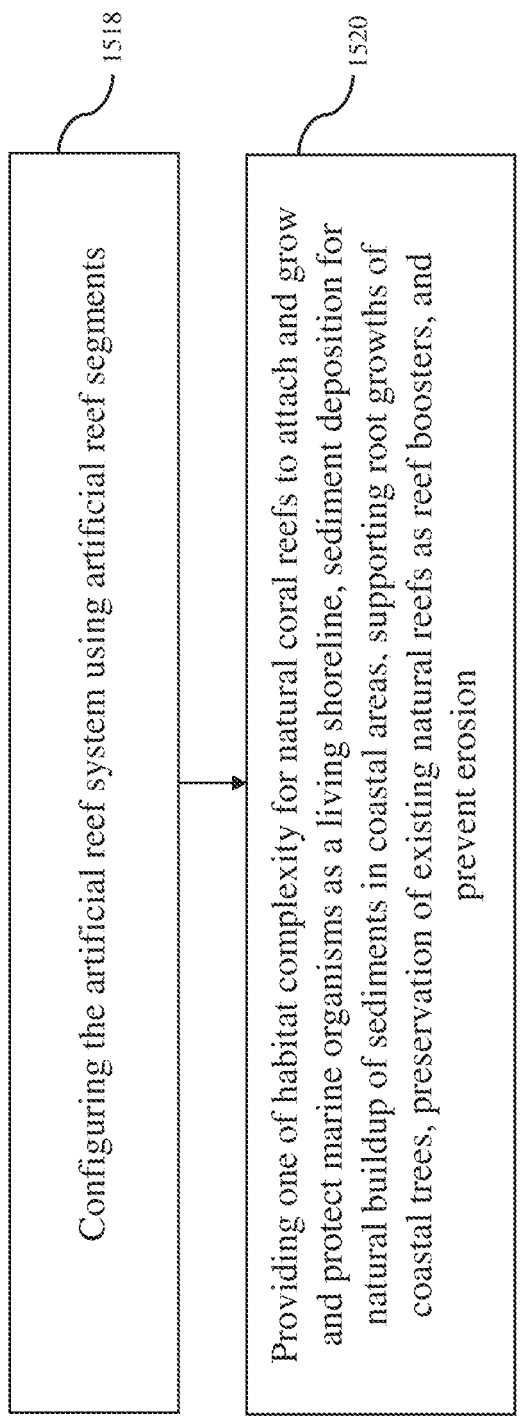

FIGS. 15A, 15B and 15C illustrate block diagrams of configuring artificial reef segments for stabilizing soil for accretion and retention of coastal water soil and for providing a water barrier, breakwater, and artificial habitation for marine life. In step 1502, a site for installation of the artificial reef system is selected. Multiple factors, such as water depth, substrate type, current patterns, and proximity to existing ecosystems at a coastal area may be considered. This may include conducting a thorough research and assessment of the chosen site, including ecological surveys, sediment analysis, and consideration of local marine life. In step 1504, a design and material of the artificial reef system may be determined. The material used for the artificial reef system may be reinforced, or have other materials embedded within or combinations of materials that are durable, non-toxic, and environmentally friendly. Examples of such material may include, concrete reinforced with fibers such as glass, polypropylene, or steel, Stainless Steel Structures, Fiber-Reinforced Polymers (FRP), Reinforced Plastics, and reinforced marine-grade concrete, Metal Matrix Composites (MMCs). In some embodiments, the homogenous curved frame structure may be created from materials such as concrete, limestone, metal, rock, organic materials such as bamboo, artificial reef modules, etc. and has a uniform structure. The design must ensure stability, durability, and resilience against environmental forces, such as currents, waves, and storms. A structurally sound artificial reef is more likely to persist over time, providing long-term benefits to marine ecosystems. The design should allow for adaptability, considering that environmental conditions and ecological dynamics may change over time. This flexibility can enhance the long-term success of the artificial reef. If the artificial reef project is part of a broader conservation or restoration initiative, the design should be scalable to accommodate larger-scale deployments if needed. In an embodiment, the design and structure of the artificial reef segment is a curved homogenous structure that provides adaptability and scalability.

In step 1506, artificial reef segments are installed at the site including anchoring the artificial reef segments to the seabed. FIG. 15B illustrate the block diagram for installing the artificial reef segments. In step 1510, the reef segments are anchored to the seabed. This may include transporting the artificial reef segments to the site using cranes or other lifting equipment. Installing a first set of artificial reef segments on the seabed in a specific pattern or design, such as a zig zag pattern. The anchoring may include attaching the structure to the substrate or using additional weights to prevent movement of the first set of artificial reef segments. Stacking a second set of artificial reef segments on the first set in step 1512, wherein the stacking would involve positioning two or more artificial reef segments sidewise on a common artificial reef segment in a pyramidal manner. Each frame segment of the second set is sized to interlock with the openings of the artificial reef segment of the first set. The artificial reef segments have interlocking sections disposed in between two cutouts of a first artificial reef segment, and is received by the opening of a second artificial reef segment. These fittings are achieved by the normal force acting on the outer portions of the frame segments by the inner portions of the openings, and the normal force acting on the inner portions of the openings by the outer portions of the frame segments. This interlocking mechanism provided by the cutout and the corresponding frame segment is a key aspect of the reef segment's design. It allows for the easy and efficient assembly of larger reef structures from individual segments and in an assembled state, the segments collectively contribute to the structural integrity and functional effectiveness of the overall artificial reef. In step 1514, the artificial reef segments are secured to each other. For example, the artificial reef segment of the second set is secured to the artificial reef segment beneath via metal wires as shown in FIGS. 14B and 14C.

The method of installing the artificial reef structure may also include placing artificial reef inserts within the openings of the artificial reef segments in step 1516. The reef inserts may be retained by removably fitting inside the openings of the reef segments and further secured within the opening using adhesive to prevent uplifting of the reef inserts. The adhesives may be water resistant and corrosion resistant, such as marine epoxy resins, polyurethane marine sealants, marine silicone sealants. In an example, the first reef insert may be positioned on top of a second reef insert with a spacing in between the reef inserts. The placing of two or more reef inserts provide more surface area and a denser structure for the marine organisms to attach and grow. These inserts have openings that facilitate water flow that are crucial as they allow the circulation of water through the insert, ensuring that essential nutrients and small organisms can flow through, which is vital for the sustenance and growth of marine life attached to the inserts. In addition to supporting coral growth, the artificial reef inserts are conducive to oyster colonization. As noted above, Oysters require sturdy and complex surfaces for attachment, and the textured surface of the inserts, especially the pyramidal protrusions, provides an ideal environment for oyster larvae to settle and grow. The presence of oysters on these inserts is particularly beneficial as they are natural water filterers, thus contributing to the overall health of the marine ecosystem.

Referring to FIG. 15A, in step 1508, a post-deployment monitoring of the artificial reef system may be performed. Post-deployment monitoring of an artificial reef system is a critical phase in assessing the success and effectiveness of the structure. This monitoring helps evaluate whether the artificial reef is achieving its intended goals, such as enhancing marine biodiversity, supporting fisheries, or providing recreational opportunities. The monitoring may include examining the condition of the artificial reef structures to ensure they remain stable and intact. This may involve underwater inspections using remotely operated vehicles (ROVs) or divers deployment plan to stack the reef segments in the desired configuration. This may also involve assessing effects of currents and waves on the artificial reef structures, as these can influence their stability and the distribution of marine organisms. One of the goals is to enhance fisheries or specific marine organisms, such as oysters by conducting surveys to assess the abundance, size, and diversity of target fish species or marine organisms.

FIG. 15C illustrates configuring the artificial reef system using artificial reef segments in step 1518. After configuration, the artificial reef system provides one of habitat complexity for natural coral reefs to attach and grow and protect marine organisms as a living shoreline, sediment deposition for natural buildup of sediments in coastal areas, supporting root growths of coastal trees, preservation of existing natural reefs as reef boosters, and prevent erosion in step 1520. The artificial reef system provides shelter, substrates, and various physical structures for habitat complexity and natural coral reefs to attach and grow to boost marine life, and protect marine organisms as a living shoreline. These structures attract fish, invertebrates, and other organisms, such as oysters contributing to a more diverse and resilient ecosystem. The openings in the artificial reef segments may provide new habitats and shelter for a variety of marine life, increasing the diversity of marine species in the area. The openings may also allow for water flow helping to increase the circulation of oxygen, nutrients, and other essential elements that support the growth of marine life. The artificial reef inserts of the artificial reef segments provide hiding spots and shelters where smaller fish and invertebrates can take refuge, making it more challenging for predators to locate and capture them, working as a living shoreline. Such reef structures provide a substrate for the attachment of marine organisms such as corals, sponges, and algae that promotes colonization of the reef by a diverse array of species, leading to increased biodiversity and ecological productivity for habitat complexity and boost marine life.

The configured reef artificial system facilitates sediment deposition for natural buildup of sediments in coastal areas to prevent erosion. The reef segments hold sediment on beaches by trapping the sediment within the openings of the segments. Such an approach not only prevents erosion but also maintains, or even enhances, the natural ecosystem functions and biodiversity. The openings of the disclosed artificial reef segments accommodate the natural growth patterns of roots of mangrove trees or other coastal trees, providing a supportive structure. The disclosed artificial reef segments provide protection to roots of coastal trees against erosion and physical disturbances. Artificial reef systems can serve as effective tools for the preservation and enhancement of existing natural reefs as reef boosters. Artificial reefs can serve as submerged breakwaters, reducing the energy of incoming waves. This attenuates wave action, protecting natural reefs from the damaging effects of excessive wave energy, such as erosion and physical breakage. By strategically placing artificial reef structures, the artificial reef system influence the flow of water currents. This can help divert strong currents away from vulnerable natural reefs, preventing sedimentation and potential damage to coral structures. Further, in cases where natural reefs are threatened by invasive species or diseases, artificial reefs can act as a form of quarantine or control. By strategically placing barriers, artificial reefs may prevent the spread of harmful agents to natural reef ecosystems.

In summary, the design of the artificial reef segment, with its strategically placed openings, is highly effective in facilitating the growth and integration of mangrove roots and other coastal trees. This interaction not only enhances the structural stability of both the mangroves and the reef segment but also reinforces the shoreline and creates a diverse and thriving marine ecosystem.

Moreso, the artificial reef segments may force waves to deposit their energy offshore rather than directly on the coastline, and in another scenario, the reef segments may hold sediment on beaches by trapping the sediment. In addition, the disclosed artificial reef segments contribute to carbon sequestration. Coastal ecosystems that include mangrove, salt marsh, seagrass, algal beds, and phytoplankton are identified as potential carbon sinks. The artificial reef segments increase biomass at artificial reefs and provide a form of blue carbon storage that actively captures and stores carbon dioxide ($CO_2$) from the atmosphere and simultaneously serves as habitats for marine life. The artificial reef segments provide a water barrier, breakwater, and artificial habitation for marine life.

The disclosed embodiments have steel attachments such as rods protruding out from side surface of the artificial reef segments that facilitate in lifting and transportation of the reef segments during and after installation of the artificial reef segments. The steel structures aid in securing the reef segments to other reef segments for a particular configuration of a reef structure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An artificial reef system comprising:
   a plurality of artificial reef segments, wherein each artificial reef segment comprises:
      a curved structure comprising:
         a vertex section;
         an exterior outermost curved surface comprising a first uniform radius of curvature from the vertex section to a terminating end of the curved structure;
         an exterior innermost curved surface comprising a second uniform radius of curvature from the vertex section to the terminating end of the curved structure;
         a thickness between the exterior outermost curved surface, the exterior innermost curved surface, a front side of the curved structure, and a back side of the curved structure;
         an opening extending through the thickness of the curved structure from the exterior outermost curved surface to the exterior innermost curved surface;
         a channel wall defined by the opening that extends from the exterior outermost curved surface to the exterior innermost curved surface; and
         wherein the thickness is substantially uniform spanning laterally between the front side and the back side;
         wherein the thickness varies between the exterior outermost curved surface and the exterior innermost curved surface such that the thickness continuously decreases from the vertex section towards the terminating end of the curved structure; and
      a transport configuration comprising a first artificial reef segment of the plurality of artificial reef segments stacked on a second artificial reef segment of the plurality of artificial reef segments such that the exterior innermost curved surface of the first artificial reef segment substantially abuts the exterior outermost curved surface of the second artificial reef segment.

2. The artificial reef system of claim 1, wherein the artificial reef system comprises a breakwater configuration comprising the plurality of artificial reef segments arranged in a zigzag pattern and wherein a first artificial reef segment of the plurality of artificial reef segments arranged on top of a second artificial reef segment of the plurality of artificial reef segments and a third artificial reef segment of the plurality of artificial reef segments, such that said terminating end of the first artificial reef segment are in attachment with the exterior outermost curved surface of each of the second artificial reef segment and the third artificial reef segment.

3. The artificial reef system of claim 1, wherein the artificial reef system further comprises an artificial reef insert.

4. The artificial reef system of claim 3, wherein the artificial reef insert comprises:
   a base structure comprising a first side and a second side; and a plurality of secondary openings within the base structure.

5. The artificial reef system of claim 4, wherein the artificial reef insert further comprises a plurality of protrusions extending from the base structure, each protrusion comprising a substantially pyramidal shape with at least one wing.

6. The artificial reef system of claim 4, wherein the artificial reef insert further comprises a three-dimensional web-like structure configured for providing a complex spatial arrangement for enhancing habitat complexity and water flow, wherein the three-dimensional web-like structure comprises a hierarchical arrangement of openings.

7. The artificial reef system of claim 1 further comprising an artificial reef configuration comprising a first artificial reef segment of the plurality of artificial reef segments arranged on top of a second artificial reef segment of the plurality of artificial reef segments and a third artificial reef segment of the plurality of artificial reef segments, such that said terminating end of the first artificial reef segment are in attachment with the exterior outermost curved surface of each of the second artificial reef segment and the third artificial reef segment.

8. The artificial reef system of claim 1 wherein the opening comprises a taper from a wide entrance point on the exterior outermost curved surface to a narrower exit point on the exterior innermost curved surface.

9. The artificial reef system of claim 1 wherein at least one artificial reef segment of the plurality of artificial reef segments comprises a longitudinal span characterized by a length greater than its width wherein said length is defined as a distance between a first terminating end and a second terminating end of the curved structure.

10. The artificial reef system of claim 1 wherein each artificial reef segment is composed substantially of a non-metallic material.

11. The artificial reef system of claim 1 wherein each artificial reef segment is composed substantially of concrete.

12. An artificial reef segment comprising:
a curved structure having a vertex section, an outer curved surface, and an inner curved surface;
an opening extending through the curved structure from the outer curved surface to the inner curved surface; and
an artificial reef insert disposed within the opening, the artificial reef insert comprising:
an insert perimeter corresponding to at least one of:
an outer curved surface opening perimeter of the opening;
an intermediate opening perimeter of the opening defined by a portion of the opening between the outer curved surface and the inner curved surface; and
an inner curved surface opening perimeter of the opening;

a base structure comprising a first side and a second side; and
a plurality of secondary openings extending through the base structure; and at least one of:
a plurality of protrusions extending from the base structure, each protrusion having a substantially pyramidal shape with at least one wing configured to increase surface area;
a three-dimensional web-like structure comprising a plurality of hierarchical openings, and
a plurality of tertiary openings within at least one secondary opening of the plurality of secondary openings thereby creating a hierarchical structure of openings within the artificial reef insert.

13. The artificial reef segment of claim 12, wherein the opening is tapered from the outer curved surface to the inner curved surface.

14. A curved artificial reef structure comprising:
a vertex section;
an exterior outermost curved surface;
an exterior innermost curved surface;
a thickness between the exterior outermost curved surface, the exterior innermost curved surface, a front side of the curved artificial reef structure, and a back side of the curved artificial reef structure; and
an opening extending through the thickness of the curved artificial reef structure from the exterior outermost curved surface to the exterior innermost curved surface;
wherein the thickness varies between the exterior outermost curved surface and the exterior innermost curved surface such that the thickness continuously decreases from the vertex section towards a terminating end of the curved artificial reef structure.

15. The curved artificial reef structure of claim 14, wherein the exterior outermost curved surface comprises a first uniform radius of curvature from the vertex section to a terminating end of the curved artificial reef structure.

16. The curved artificial reef structure of claim 15, wherein the exterior innermost curved surface comprises a second uniform radius of curvature from the vertex section to the terminating end of the curved artificial reef structure.

17. The curved artificial reef structure of claim 16, wherein the thickness is substantially uniform spanning laterally between the front side and the back side.

18. The curved artificial reef structure of claim 17 comprising a channel wall defined by the opening that extends from the exterior outermost curved surface to the exterior innermost curved surface.

19. The curved artificial reef structure of claim 18 wherein the first uniform radius of curvature substantially equals the second uniform radius of curvature.

20. The curved artificial reef structure of claim 19 wherein each artificial reef segment is composed substantially of a non-metallic material.

\* \* \* \* \*